(12) United States Patent
Mlinar et al.

(10) Patent No.: US 10,110,839 B2
(45) Date of Patent: Oct. 23, 2018

(54) DUAL-PHOTODIODE IMAGE PIXEL

(71) Applicant: SEMICONDUCTOR COMPONENTS INDUSTRIES, LLC, Phoenix, AZ (US)

(72) Inventors: Marko Mlinar, Horjul (SI); Tomas Geurts, Haasrode (BE); Manuel Innocent, Wezemaal (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 72 days.

(21) Appl. No.: 15/145,374

(22) Filed: May 3, 2016

(65) Prior Publication Data
US 2017/0324917 A1    Nov. 9, 2017

(51) Int. Cl.
*H04N 3/14*    (2006.01)
*H04N 5/335*    (2011.01)
*H04N 5/359*    (2011.01)
*H04N 5/372*    (2011.01)

(52) U.S. Cl.
CPC ........... *H04N 5/3592* (2013.01); *H04N 5/372* (2013.01)

(58) Field of Classification Search
CPC ........... H01L 27/1463; H01L 27/14643; H01L 27/14689; H01L 27/14672; H01L 27/14674; H01L 27/14612; H01L 27/14614; H01L 27/14641; H01L 27/14609
See application file for complete search history.

(56) References Cited

U.S. PATENT DOCUMENTS

| | | |
|---|---|---|
| 4,936,190 A | 6/1990 | Pilcher |
| 6,750,523 B2 | 6/2004 | Blanchard |
| 7,075,049 B2 | 7/2006 | Rhodes et al. |
| 7,208,742 B1 | 4/2007 | Zelakiewicz et al. |
| 7,332,786 B2 | 2/2008 | Altice et al. |
| 7,432,540 B2 | 10/2008 | McKee |
| 7,718,459 B2 | 5/2010 | Patrick et al. |
| 7,728,896 B2 | 6/2010 | McKee |
| 7,884,402 B2 | 2/2011 | Ki |
| 8,077,237 B2 | 12/2011 | Li |
| 8,089,036 B2 | 1/2012 | Manabe |

(Continued)

*Primary Examiner* — Kelly L Jerabek
(74) *Attorney, Agent, or Firm* — Treyz Law Group, P.C.; Vineet Dixit

(57) ABSTRACT

An image sensor may have an array of pixels that include nested sub-pixels that each have at least one respective photodiode. An inner sub-pixel of a pixel with nested sub-pixels may have a relatively lower effective light collecting area compared to an outer sub-pixel of the pixel within which the inner sub-pixel is nested. A pixel circuit for the nested sub-pixels may include an overflow capacitor and/or a coupled gate circuit used to route charges from the photodiode in the inner sub-pixel. The lower light collecting area of the photodiode in the inner sub-pixel, with optional flicker mitigation charge routing from the coupled gates structure, may reduce the size of the capacitors required to capture photodiode and photodiode overflow charge responses. Flicker mitigation charge routing using a coupled gates structure may allow an adjustable proportion of the overflow charge to be stored in one or more storage capacitors.

17 Claims, 16 Drawing Sheets

(56) References Cited

U.S. PATENT DOCUMENTS

| | | | |
|---|---|---|---|
| 8,773,562 B1* | 7/2014 | Fan | H01L 27/14643 |
| | | | 348/308 |
| 8,792,029 B2 | 7/2014 | Lee | |
| 9,118,883 B2 | 8/2015 | Wan | |
| 2005/0110093 A1* | 5/2005 | Altice, Jr. | H01L 27/14609 |
| | | | 257/359 |
| 2007/0035649 A1 | 2/2007 | McKee | |
| 2009/0108176 A1 | 4/2009 | Blanquart | |
| 2009/0237540 A1 | 9/2009 | Johnson | |
| 2013/0208154 A1* | 8/2013 | Wang | H04N 5/3575 |
| | | | 348/280 |
| 2015/0244950 A1* | 8/2015 | Johnson | H04N 5/3535 |
| | | | 348/296 |
| 2016/0255289 A1* | 9/2016 | Johnson | H04N 5/355 |
| | | | 348/273 |
| 2017/0047363 A1* | 2/2017 | Choi | H01L 27/1463 |
| 2017/0146657 A1* | 5/2017 | Xu | G01S 17/36 |
| 2017/0353680 A1* | 12/2017 | Fukuda | H04N 5/367 |

* cited by examiner

DUAL-PHOTODIODE IMAGE PIXEL

BACKGROUND

This relates generally to imaging sensors, and more particularly, to imaging sensors with pixels that include more than one photosensitive region.

Modern electronic devices such a cellular telephones, cameras, and computers often use digital image sensors. Imagers (i.e., image sensors) are formed from a two-dimensional array of image sensing pixels. Each pixel may include a photosensor such as a photodiode that receives incident photons (light) and converts the photons into electrical charges. Conventional image pixel arrays include frontside illuminated image pixels or backside illuminated image pixels. Image pixels are fabricated on a semiconductor substrate using complementary metal-oxide-semiconductor (CMOS) technology or charge-coupled device (CCD) technology. The image sensors may include photodiodes and other operational circuitry such as transistors formed in a front surface of the substrate. A single image sensing pixel in the two-dimensional array of image sensing pixels includes a single photosensitive region, a color filter formed over the photosensitive region, and a single dome-shaped micro-lens formed over the color filter.

Electrical cross-talk can negatively impact the performance of an imager. Ideally, a photosensitive region associated with a red pixel would accumulate charge corresponding to the amount of red light that has been received at the photosensitive region, a photosensitive region associated with a green pixel would accumulate charge corresponding to the amount of green light that has been received at the photosensitive region, and a photosensitive region associated with a blue pixel would accumulate charge corresponding to the amount of blue light that has been received at the photosensitive region.

However, there is often undesired electrical cross-talk between adjacent pixels associated with different colors. Undesired electrical cross-talk is characterized by photogenerated charges generated in the semiconductor region of a pixel associated with one color being collected by the photosensitive region (i.e., the photodiode) of a pixel associated with a different color. An example of undesired electrical cross-talk is when photogenerated charges that were generated in response to red light diffuse into and are collected by a photosensitive region associated with a green pixel (i.e., a photosensitive region that should receive green light and generate charges corresponding to the amount of green light received). Electrical cross-talk can also degrade the output image quality of an imager.

When viewed as a whole, the array of color filters associated with the array of image sensing pixels in the image sensor is referred to as a color filter array. Many imagers use a Bayer color filter array in which vertically and horizontally adjacent color filters in the array are of different colors. The Bayer color filter array includes red, green, and blue color filters. Ideally, photosensitive regions associated with a pixel having a red color filter would only be exposed to light that has passed through a red color filter, photosensitive regions associated with a pixel having a green color filter would only be exposed to light that has passed through a green color filter, and photosensitive regions associated with a pixel having a blue color filter would only be exposed to light that has passed through a blue color filter.

However, there is often undesired optical and electrical cross-talk between adjacent pixels associated with different colors (i.e., having color filters of different colors). Undesired optical cross-talk is characterized by light passing through a color filter of one color and impeding on a photosensitive region of a pixel associated with a different color. An example of undesired optical cross-talk is when light that has passed through a red color filter impedes on a photosensitive region associated with a green pixel (i.e., a pixel having a green color filter). Optical cross-talk is often caused by high incident angle light and flare conditions, and can degrade the output image quality of an imager. Electrical cross-talk occurs when electrons from a photosensitive region of one color migrate into a photosensitive region of a pixel associated with a different color. Both electrical and optical cross-talks can significantly influence the less responsive light collecting areas on an image sensor and can degrade the output image quality of an imager.

Moreover, in conventional imaging systems, image artifacts may be caused by moving objects, moving or shaking camera, flickering lighting, and objects with changing illumination in an image frame. Such artifacts may include, for example, missing parts of an object, edge color artifacts, and object distortion. Examples of objects with changing illumination include light-emitting diode (LED) traffic signs (which can flicker several hundred times per second) and LED brake lights or headlights of modern cars.

Conventional imaging systems also may have images with artifacts associated with low dynamic range. Scenes with bright and dark portions may produce artifacts in conventional image sensors, as portions of the image may be over exposed or under exposed.

It would therefore be desirable to be able to provide improved image pixels for imaging devices.

DETAILED DESCRIPTION

Embodiments of the present invention relate to image sensors, and more particularly, to image sensors having pixels that each contain multiple sub-pixel structures. It will be recognized by one skilled in the art, that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices include image sensors that gather incoming light to capture an image. The image sensors may include arrays of image pixels. The image pixels in the image sensors may include photosensitive elements such as photodiodes that convert the incoming light into electric charge. The electric charges may be stored and converted into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Image sensors may be provided with one or more arrays of multi-photodiode image pixels (sometimes referred to herein as donut photodiode pixels, donut image pixels, donut pixels, nested sub-pixels, super-pixels, image pixels, or pixels). Multi-photodiode image pixels may include photosensitive elements formed in a substrate and that are adjacent to one another. Each multi-photodiode image pixel may have two, three, five, nine, or any other suitable number of photodiodes. The multiple photodiodes in each donut pixel may be grouped into an outer sub-pixel group and an inner sub-pixel group. It may be desirable for the outer sub-pixel group of a donut pixel to be more sensitive to incident light than the inner sub-pixel group. The outer sub-pixel group may include one, two, four, eight, or any other suitable of sub-pixels. The inner sub-pixel group may include one or more sub-pixels. One or more microlenses or other light guiding structures may be formed over the multi-sub-pixel image pixel to direct light to the photodiode(s) in the outer sub-pixel group.

Figure 1:
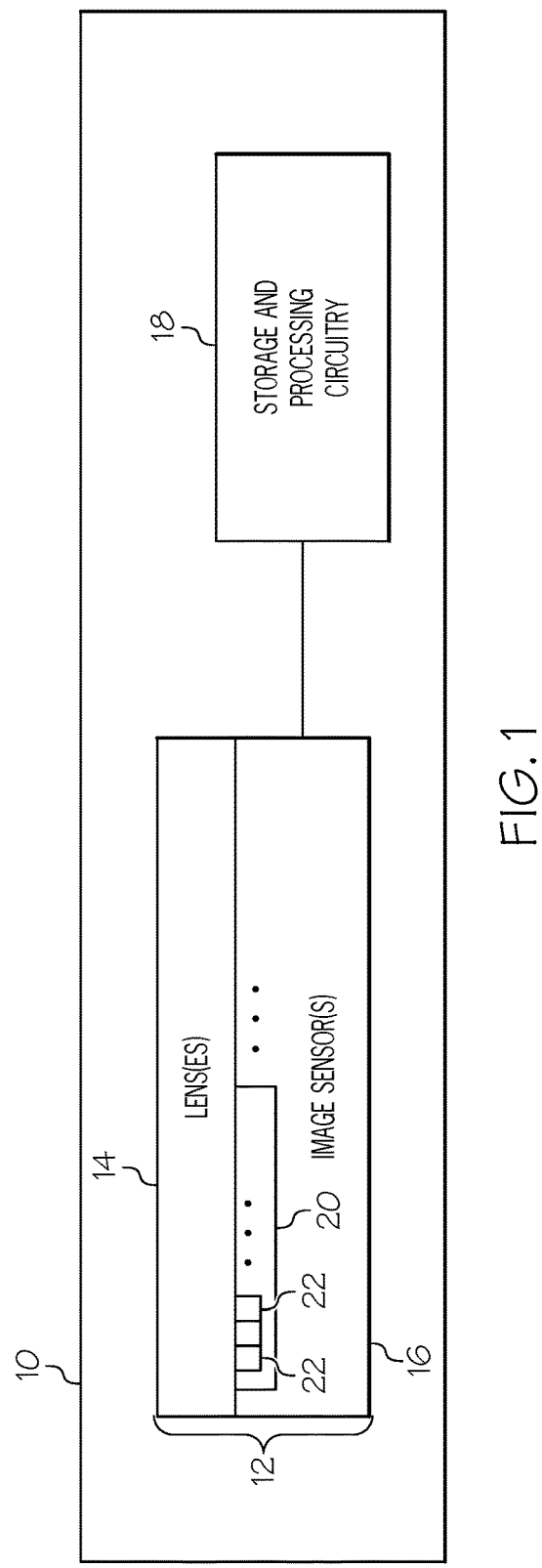
FIG. 1 is a diagram of an illustrative electronic device in accordance with an embodiment.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 provides corresponding digital image data to processing circuitry 18. Image sensor 16 may, for example, be a backside illumination image sensor. If desired, camera module 12 may be provided with an array of lenses 14 and an array of corresponding image sensors 16.

Control circuitry such as storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18. Processing circuitry 18 may be used in controlling the operation of image sensors 16.

Image sensors 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices. Image pixels 22 may be frontside illumination (FSI) image pixels or backside illumination (BSI) image pixels. Image pixels 22 may include one or more sub-pixels. Each sub-pixel in an image pixel 22 may have a photodiode or photodiode region and readout circuitry for the photodiode or photodiode region. Readout circuitry associated with each photodiode or photodiode region in a given sub-pixel may include transfer gates, floating diffusion regions, and reset gates. Isolation regions between sub-pixels may also be considered part of either or both of the sub-pixels between which the isolation structure is formed.

An image sensor 16 may be provided with control circuitry that provides the pixel supply voltage (such as VAA), pixel ground voltage, intermediate fixed voltages (i.e., fixed voltages between VAA and the pixel ground voltage), and control signals to the transistors of the pixel circuits in each of the image pixels 22. The sensor control circuitry may provide control signals for the transfer transistors, charge overflow transfer transistors, reset transistors, row select transistors, anti-blooming transistors, or generally, any transistors in the pixel circuit or pixel readout circuitry coupled to the pixels.

Figure 2:
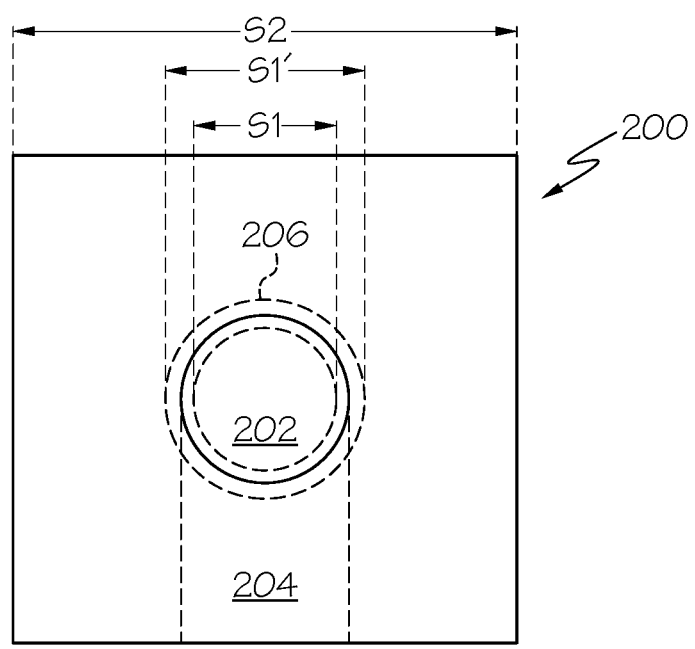
FIG. 2 is a surface view of nested sub-pixels with an inner sub-pixel having a circular light collecting surface in accordance with an embodiment.

FIG. 2 is a surface view of nested sub-pixels 200 in a pixel 22 of array 20. Nested sub-pixels 200 may be an alternate embodiment to the nested sub-pixels of FIGS. 3 and 4. The surface view of the nested sub-pixels 200 of FIG. 2 may be referred to as a diagram of the light collecting areas (LCAs) of the nested sub-pixels 200. Nested sub-pixels 200 may correspond to photodiodes with associated pixel circuitry used to capture the same spectrum of light. As an example, the nested sub-pixels 200 may be used to capture red, green, blue, cyan, magenta, yellow, near-infrared, infrared, or any other spectrum of light. A single red, green, blue, cyan, magenta, yellow, near-infrared, infrared, or clear color filter may be formed over the nested sub-pixels 200. In certain embodiments, the color filter formed over nested sub-pixels 200 may have areas that pass colored light and areas that are clear (i.e., that pass visible or full-spectrum light outside the visible spectrum).

Nested sub-pixels 200 shown in FIG. 2 may be included in a subset of the pixels 22 of array 20, or in all of the pixels 22 of array 20. The nested sub-pixels 200 of FIG. 2 may include a first sub-pixel 202, which may be referred to as the inner sub-pixel 202. Inner sub-pixel 202 may be completely surrounded by a second sub-pixel 204, which may be referred to as the outer sub-pixel 204. Inner sub-pixel 202 and outer sub-pixel 204 may correspond to n-type doped photodiode regions in a semiconductor substrate and respective sub-pixel circuitry in the substrate such as transfer gates, floating diffusion regions, and reset gates of the nested sub-pixels 200 that is coupled to the photodiode regions in the sub-pixels 202 and 204. The semiconductor substrate (not shown) may be a bulk p-type substrate made of silicon, or any other suitable semiconductor material.

A photodiode in inner sub-pixel 202 may have a circular shape at the surface. In other words, the light collecting area of inner sub-pixel 202 is a circular region. At the surface, the inner sub-pixel 202 may have a diameter S1. As an example, the diameter S1 of a photodiode in inner sub-pixel 202 may be 1 micron, but may alternatively be any other dimension without departing from the scope of the present embodiment. Outer sub-pixel 204 may have a square outer boundary and a circular inner boundary at the surface. The area enclosed by the square outer boundary and circular inner boundary of outer sub-pixel 204 shown in FIG. 2 may correspond to the light collecting area of outer sub-pixel 204. The circular inner boundary of outer sub-pixel 204 at the surface may be similar in shape but larger in size to the outer boundary of the inner sub-pixel 202 (i.e., the circular inner boundary of outer sub-pixel 204 has a diameter S1' that is greater than the diameter S1). As shown in FIG. 2, the length of one of the sides of outer sub-pixel 204 is S2. As an example, S2 may be 3 microns, but may alternatively be any other dimension without departing from the scope of the present embodiment. The length S2 is preferably greater than the length S1. Outer sub-pixel 204 is illustrated in FIG. 2 as having a square outer boundary but may alternatively have a rectangular outer boundary.

In between the inner sub-pixel 202 and the outer sub-pixel 204, an isolation region 206 may be formed. The isolation region 206 may be devoid of any circuitry related to the pixel 22 or its sub-pixels 202 and 204. Isolation region 206 may separate individual sub-pixels in a given sub-pixel group from one another, and may also separate individual sub-pixels in different respective sub-pixel groups from one another. Isolation region 206 may include different types of isolation devices such as trench isolation structures, doped semiconductor regions, metallic barrier structures, or any other suitable isolation device.

The inner sub-pixel 202 may have a lower sensitivity to incident light, and may be referred to as having a lower sensitivity light collecting area compared to outer sub-pixel 204. The respective doping concentrations of inner sub-pixel 202 and outer sub-pixel 204 may be different or they may be the same. As an example, the doping concentrations of photodiode regions in inner sub-pixel 202 may be modified to reduce the sensitivity of inner sub-pixel 202 to light. However, for the sake of simplicity in explaining and highlighting the properties of the nested sub-pixels 200, it will be assumed that the sub-pixels 202 and 204 have photodiodes with the same doping concentrations. The lower sensitivity to incident light of inner sub-pixel 202 compared to outer sub-pixel 204 may be a result of the lower light collecting area of inner sub-pixel 202 compared to the light collecting area of outer sub-pixel 204.

One or more microlenses (not shown in FIG. 2) may be formed over the nested sub-pixels 200 of FIG. 2 to direct light toward the outer sub-pixel 204. The one or more microlenses may be formed over the color filter formed over nested sub-pixels 200 (not shown in FIG. 2). To direct light toward outer sub-pixel 204, the one or more microlenses may be formed over only outer sub-pixel 204. In some embodiments however, the one or more microlenses that direct light toward outer sub-pixel 204 may partially overlap the light collecting area of sub-pixel 202. Directing light toward outer sub-pixel 204 may further increase the sensitivity of the light collecting area of outer sub-pixel 204, relative to the sensitivity of the light collecting area of inner sub-pixel 202. In other words, because a larger amount of light incident on nested sub-pixels 200 is directed to outer sub-pixel 204 than to inner sub-pixel 202, inner sub-pixel 202 is said to have a lower sensitivity light collecting area compared to outer sub-pixel 204.

When a single color filter is formed over nested sub-pixels 200, the inner sub-pixel 202 and outer sub-pixel 204 receive incident light 210 of the same color. The electrical cross talk between sub-pixels 202 and 204 is therefore cross-talk between sub-pixels receiving light of the same color, and is therefore manageable before or after the readout of the pixel 22 in which nested sub-pixels 200 are located.

Figure 3:
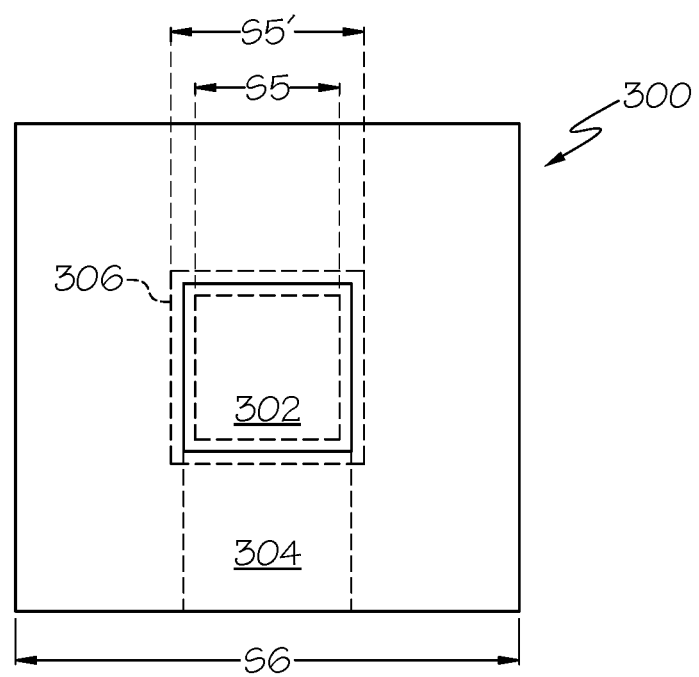
FIG. 3 is a surface view of nested sub-pixels with an inner sub-pixel having a rectangular light collecting surface in accordance with an embodiment.
Figure 4:
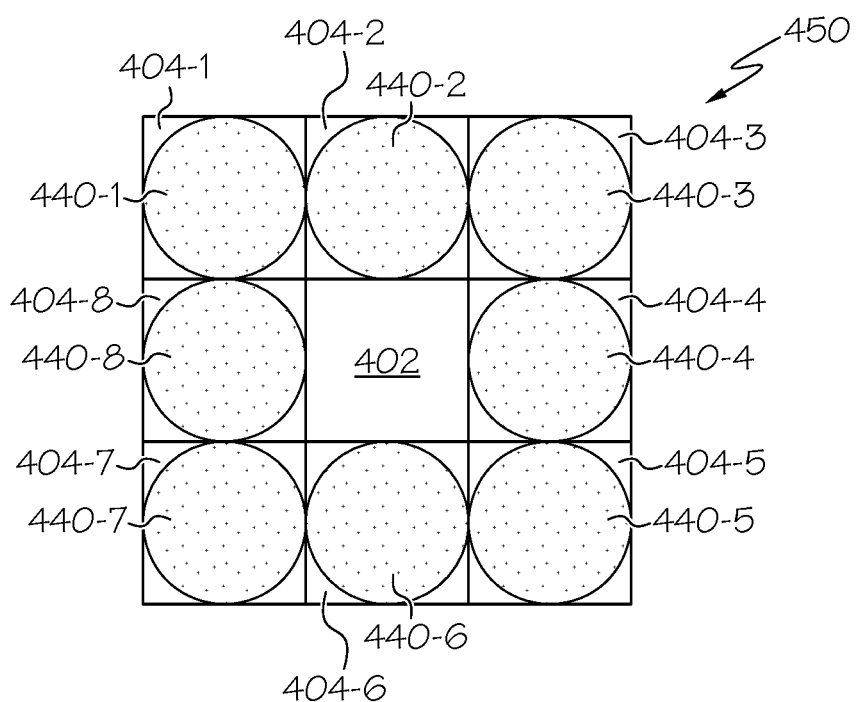
FIG. 4 is a diagram of a microlens placement over each sub-pixel of an inner sub-pixel group and an outer sub-pixel group arranged in a grid layout, in accordance with an embodiment.

When a first sub-pixel structure is said to be nested within a second sub-pixel structure, it is entailed that the first sub-pixel structure is laterally surrounded by the second sub-pixel structure as illustrated in at least FIGS. 2-4. Taking FIG. 2 as an example, it can be appreciated that the outer sub-pixel structure 204 laterally surrounds the inner sub-pixel structure 202. In other words, outer sub-pixel 204 surrounds the inner sub-pixel 202 except at surfaces 216 and 218 of the inner sub-pixel 202 (i.e., outer sub-pixel 204 laterally surrounds inner sub-pixel 202). When a first sub-pixel structure is said to be nested within a second sub-pixel structure, it is also entailed that no additional intervening pixels or sub-pixels are formed in a region between the first and second sub-pixels. Again, taking FIG. 2 as an example, it can be appreciate that any space between sub-pixels 202 and 204 is free from additional pixel or sub-pixel structures.

Two sub-pixels may properly thought to be nested when one of the sub-pixels laterally surrounds the other sub-pixel and when any space between the sub-pixels is devoid of any other pixel or sub-pixel structures. When a first sub-pixel is nested within a second sub-pixel the aforementioned sense, the second sub-pixel can also be said to "immediately surround" the first sub-pixel.

While the above definition of nesting or "immediate surrounding" was described in connection with two sub-pixels, a sub-pixel group may also be properly be thought to immediately surround another sub-pixel or sub-pixel group. When a sub-pixel is laterally surrounded by a sub-pixel group that includes multiple sub-pixels, and when any space between the sub-pixel and the sub-pixel group is devoid of any other sub-pixels or pixels, the sub-pixel is immediately surrounded by, or nested within, the sub-pixel group. In a similar manner, a first sub-pixel group may be immediately surrounded by, or nested within, a second sub-pixel group.

The light collecting area of the innermost sub-pixel structure of a pixel may influence or help determine the shape of additional sub-pixel structures in the pixel within which the innermost sub-pixel structure is nested. As seen in FIG. 2, for example, the shape of the light collecting area of inner sub-pixel 202 determines the shape of the light collecting area of outer sub-pixel 204. Specifically, because the outer boundary of inner sub-pixel 202 (i.e., the interface of inner sub-pixel 202 and the isolation region 206 or outer sub-pixel 204) is circular, the inner boundary of the outer sub-pixel 204 also has a circular shape. When, as described above, a pixel has any number of nested sub-pixels, the shape of the light collecting area of the innermost sub-pixel or sub-pixel group may be elliptical, circular (as shown in FIG. 2), rectangular, or square (as shown in FIG. 3). Pixels are not limited in the number of nested sub-pixels they can have by the shape of the light collecting area of their innermost sub-pixel. In other words, the number of nested sub-pixels may be increased regardless of whether the innermost sub-pixel is elliptical, circular, rectangular, or square. Generally, when a sub-pixel group or an individual sub-pixel is referred to as having an elliptical shape, the sub-pixel group or individual sub-pixel may have a circular shape or any other elliptical shape. Similarly, when a sub-pixel group or an individual sub-pixel is referred to as having a rectangular shape, the sub-pixel group or individual sub-pixel may have a square shape or any other rectangular shape.

FIG. 3 is a surface view of nested sub-pixels 300 in a pixel 22 of array 20. Nested sub-pixels 300 may be an alternate embodiment to the nested sub-pixels of FIGS. 2 and 4. The surface view of the nested sub-pixels 300 of FIG. 3 may be referred to as a diagram of the light collecting areas (LCAs) of the nested sub-pixels 300. Nested sub-pixels 300 may correspond to sub-pixels used to capture the same spectrum of light. As an example, the nested sub-pixels 300 may be used to capture red, green, blue, cyan, magenta, yellow, near-infrared, infrared, or any other spectrum of light. A single red, green, blue, cyan, magenta, yellow, near-infrared, infrared, or clear color filter may be formed over the nested sub-pixels 300. In certain embodiments, the color filter formed over nested sub-pixels 300 may have areas that pass colored light and other areas that are clear (i.e., that pass visible spectrum light).

Nested sub-pixels 300 shown in FIG. 3 may be included in a subset of the pixels 22 of array 20, or in all of the pixels 22 of array 20. The nested sub-pixels 300 of FIG. 3 may include a first sub-pixel 302, which may be referred to as the inner sub-pixel 302. Inner sub-pixel 302 may be completely surrounded by a second sub-pixel 304, which may be referred to as the outer sub-pixel 304. Inner sub-pixel 302 and outer sub-pixel 304 may correspond to n-type doped photodiode regions in a semiconductor substrate and respective sub-pixel circuitry in the substrate such as transfer gates, floating diffusion regions, and reset gates of the nested sub-pixels 300 that is coupled to the photodiode regions in the sub-pixels 302 and 304. The semiconductor substrate (not shown) may be a bulk p-type substrate made of silicon, or any other suitable semiconductor material.

Inner sub-pixel 302 may have a square shape at the surface. In other words, the light collecting area of inner sub-pixel 302 is a square region. Generally, the inner sub-pixel 302 may have a rectangular light collecting area. At the surface, the inner sub-pixel 302 may have a width S5. As an example, the width S5 of inner sub-pixel 302 may be 1 micron, but may alternatively be any other dimension without departing from the scope of the present embodiment. Outer sub-pixel 304 may have a square outer boundary and a square inner boundary at the surface. The area enclosed by the square outer boundary and inner boundary of outer sub-pixel 304 shown in FIG. 3 may correspond to the light collecting area of outer sub-pixel 304. The square inner boundary of outer sub-pixel 304 at the surface may be similar in shape but larger in size to the outer boundary of the inner sub-pixel 302 (i.e., the square inner boundary of outer sub-pixel 304 has a width S5' that is greater than the width S5). As shown in FIG. 3, the length of one of the sides of the outer boundary of outer sub-pixel 304 is S6. As an example, S6 may be 3 microns, but may alternatively be any other dimension without departing from the scope of the present embodiment. The width S6 is preferably greater than the widths S5 and S5'. Outer sub-pixel 304 is illustrated in FIG. 3 as having a square outer boundary, but may alternatively have a rectangular outer boundary. Similarly, the outer boundary of inner sub-pixel 302 and the inner boundary of outer sub-pixel 304 may be rectangular as well.

In between the inner sub-pixel 302 and the outer sub-pixel 304, an isolation region 306 may be formed. The isolation region 306 may be devoid of any circuitry related to the pixel 22 or its sub-pixels 302 and 304. Isolation region 306 may separate individual sub-pixels in a given sub-pixel group from one another, and may also separate individual sub-pixels in different respective sub-pixel groups from one another. Isolation region 306 may include different types of isolation devices such as trench isolation structures, doped semiconductor regions, metallic barrier structures, or any other suitable isolation device.

The inner sub-pixel 302 may have a lower sensitivity to incident light, and may be referred to as having a lower sensitivity light collecting area (or more simply, size) compared to outer sub-pixel 304. The respective doping concentrations of inner sub-pixel 302 and outer sub-pixel 304 may be different or they may be the same. As an example, the doping concentrations of photodiode regions in inner sub-pixel 302 may be modified to reduce the sensitivity of inner sub-pixel 302 to light. However, for the sake of simplicity in explaining and highlighting the properties of the nested sub-pixels 300, it will be assumed that the sub-pixels 302 and 304 have photodiodes with the same doping concentrations. The lower sensitivity to incident light of inner sub-pixel 302 compared to outer sub-pixel 304 may be a result of the lower light collecting area of inner sub-pixel 302 compared to the light collecting area of outer sub-pixel 304. It will be assumed for the purposes of explaining the embodiment that lower light sensitivity of the inner sub-pixel 302 relative to the light sensitivity of outer sub-pixel 304 is due to the smaller size, or more specifically the smaller light collecting area, of the inner sub-pixel 302 relative to the outer sub-pixel 304.

One or more microlenses (not shown in FIG. 3) may be formed over the nested sub-pixels 300 of FIG. 3 to direct light toward the outer sub-pixel 304. The one or more microlenses may be formed over the color filter formed over nested sub-pixels 300 (not shown in FIG. 3). To direct light toward outer sub-pixel 304, the one or more microlenses may be formed over only outer sub-pixel 304. In some embodiments however, the one or more microlenses that direct light toward outer sub-pixel 304 may partially overlap the light collecting area of sub-pixel 302. Directing light toward outer sub-pixel 304 may further increase the sensitivity of the light collecting area of outer sub-pixel 304, relative to the sensitivity of the light collecting area of inner sub-pixel 302. In other words, because a larger amount of light incident on nested sub-pixels 300 is directed to outer sub-pixel 304 than to inner sub-pixel 302, inner sub-pixel 302 is said to have a lower sensitivity light collecting area compared to outer sub-pixel 304.

FIG. 3B is a cross-sectional side view of nested sub-pixels 300 along the A-A' line in FIG. 3A. FIG. 3B illustrates an isolation region 306 between inner sub-pixel 302 and outer sub-pixel 304. Isolation region 306 may be perpendicular to the light collecting surface 316 of nested sub-pixels 300. When isolation region 306 is perpendicular to the surface 316, the angle 314 between isolation region 306 and surface 316 may be 90 degrees, and the length across inner sub-pixel 302 at surface 316 may be the same as the length across inner sub-pixel 302 at an opposite surface 318. Alternatively, design considerations or implementation constraints in certain manufacturing processes may result in angle 314 between isolation region 306 and surface 316 being greater than or less than 90 degrees. When angle 314 is not 90 degrees, the length across inner sub-pixel 302 at surface 316 may be different from the length across inner sub-pixel 302 at surface 318.

During a light collecting interval, light 310 incident on nested sub-pixels 300 may be absorbed by inner sub-pixels 302 and outer sub-pixels 304. As described above in connection with FIG. 3A, the outer sub-pixel 304 has a more sensitive light collecting area compared to inner sub-pixel 302 due to at least the larger size of outer sub-pixel 304 and the one or more microlenses formed on nested sub-pixels 300 to direct charge toward outer sub-pixel 304, or equivalently, away from inner sub-pixel 302. As a result of outer sub-pixel 304 having a more sensitive light collecting area, the number of photogenerated charges in outer sub-pixel 304 after exposure to incident light 310 may be larger than the number of photogenerated charges in inner sub-pixel 302 after exposure to the incident light 310.

Photogenerated charges in outer photodiode 304 may leak or diffuse across isolation region 306 and into inner sub-pixel 302. Isolation region 306 may have first and second regions separated by a boundary 307. Isolation devices used in the isolation region 306 may include isolation structures of various types, such as trench isolation structures, doped semiconductor regions, and metallic barriers, which may be formed in one or both of the first and second regions of isolation region 306. When the same type of isolation device is formed in both the first and second regions of isolation region 306 (i.e., when a single isolation device type is formed in isolation region 206) the isolation device in region 306 may be continuous. When the type of isolation device in a first region of isolation region 306 having a height h3 is different from the type of isolation device in a second region of isolation region 306 having a height h4, the isolation devices in region 306 may be discontinuous for the depth of photodiodes in the nested sub-pixels 300.

The leaking of charge from one photodiode region of a sub-pixel into another photodiode region of another sub-pixel is generally referred to as electrical cross-talk. Because a single color filter is formed over nested sub-pixels 300, the inner sub-pixel 302 and outer sub-pixel 304 receive incident light 310 of the same color. As a result, photogenerated charge that diffuses or leaks from outer photodiode 304 across isolation region 306 into inner sub-pixel 302 is corresponds to charge produced in response to the same color that produced photogenerated charges in inner photodiode 302. The electrical cross talk between photodiode regions in sub-pixels 302 and 304 is therefore cross-talk between photodiodes receiving light of the same color, and is therefore manageable. The electrical cross talk between photodiodes in sub-pixels 302 and 304 may be accounted for or managed during readout of the pixel 22 in which nested sub-pixels 300 are located, or after the readout of the pixel 22 in which the nested sub-pixels 300 are located.

The area of the isolation region 306 interface across which charges leak or diffuse from outer sub-pixel 304 to inner sub-pixel 302 may be dependent on the angle 314 between isolation region 306 and surface 316. When the angle 314 is less than or greater than 90 degrees, the area of surface 306 is increased, which increases the amount of electrical cross talk between sub-pixels 302 and 304, because the area over which photogenerated charges can diffuse (i.e., the interface area of isolation region 306) is increased.

While the examples of FIGS. 2 and 3 respectively relate to nested pixels with elliptical and rectangular inner sub-pixels, the inner sub-pixels of nested sub-pixels may have any shape. As an example, the inner sub-pixels of nested sub-pixels may have a pentagonal, hexagonal, heptagonal, or octagonal shape. In general, the inner sub-pixels may have any polygonal shape. As the shape of the inner sub-pixel determines the shape of the inner boundary of the sub-pixel in which it is nested, the shape of the nesting sub-pixels that surround the inner sub-pixel may also be any polygonal shape. The outer boundary of the outer-most nested sub-pixel (i.e., the outer boundary of the pixel 22) may have a diamond shape, a square shape, a rectangular shape, or any other suitable polygonal shape.

FIG. 4 illustrates the placement of circular microlenses over nested sub-pixels 450. The nested sub-pixels 450 are illustrated as having a 3 by 3 array of square image pixels. The eight square sub-pixels 404 on the periphery of nested sub-pixels 450 may be considered an outer sub-pixel group that surrounds inner sub-pixel 402. Generally, the sub-pixels 404 in the outer sub-pixel group need not be square, but may still be equally sized. Sub-pixels 404 in the outer sub-pixel group may each have the same dimensions as inner sub-pixel 402. Viewed in this way, the pixel 450 having nested sub-pixels may be seen as a variant of the FIG. 3 embodiment in which the outer sub-pixel 304 has been divided into eight sections, or into sub-pixels 404-1, 404-2, 404-3, 404-4, 404-5, 404-6, 404-7, and 404-8. The sub-pixels 404-1, 404-2, 404-3, 404-4, 404-5, 404-6, 404-7, and 404-8 may collectively be referred to as the outer sub-pixel group 404. The placement of circular microlenses 440 may correspond to a one-to-one placement of microlenses for each sub-pixel. Microlenses 440-1, 440-2, 440-3, 440-4, 440-5, 440-6, 440-7, and 440-8 may be respectively formed over the sub-pixels 404-1, 404-2, 404-3, 404-4, 404-5, 404-6, 404-7, and 404-8 in the outer sub-pixel group 404.

The placement of microlenses 440 over sub-pixels in the outer group 404 may direct light to outer sub-pixel group 404. Specifically, each of the microlenses 440 may direct light to only the respective sub-pixel in outer sub-pixel group 1004 over which it is formed. The placement of microlenses 440 as illustrated in FIG. 4 may increase the sensitivity of the light collecting area of outer sub-pixel group 404 relative to an arrangement in which microlenses 440 are not formed at all. In the pixel 450 illustrated in FIG. 4, a microlens over the inner sub-pixel 402 may be omitted to avoid increasing the sensitivity for the light collecting area of inner sub-pixel 402. However, if desired, a microlens may be formed over the inner sub-pixel 402.

As described above in connection with FIGS. 2-4, the pixels 200, 300, and 450 may include at least one inner sub-pixel group that includes one or more inner sub-pixels 202/302/402 and at least one outer sub-pixel group that includes one or more outer sub-pixels 204/304/404 in which the one or more inner sub-pixels 202/302/402 may be nested. In each of the inner sub-pixels 202/302/402, there may be a first photodiode. In each of the outer sub-pixels 204/304/404, there may be a second photodiode. In the example of the pixel 450 of FIG. 4, each of the sub-pixels 404-1 through 404-8 in the sub-pixel group 404 may contain a respective photodiode. Generally, for the purposes of describing the pixel circuitry used in conjunction with the nested sub-pixels of FIGS. 2-4, it may be assumed that the photodiodes in a given sub-pixel group are all connected in parallel, and therefore effectively function as a single photodiode for the given sub-pixel group. For example, in the case of the nested sub-pixels 450 of FIG. 4, it may be assumed that each of the photodiodes in the sub-pixels 404-1 through 404-8 are connected in parallel, and therefore function as a single photodiode.

Figure 5:
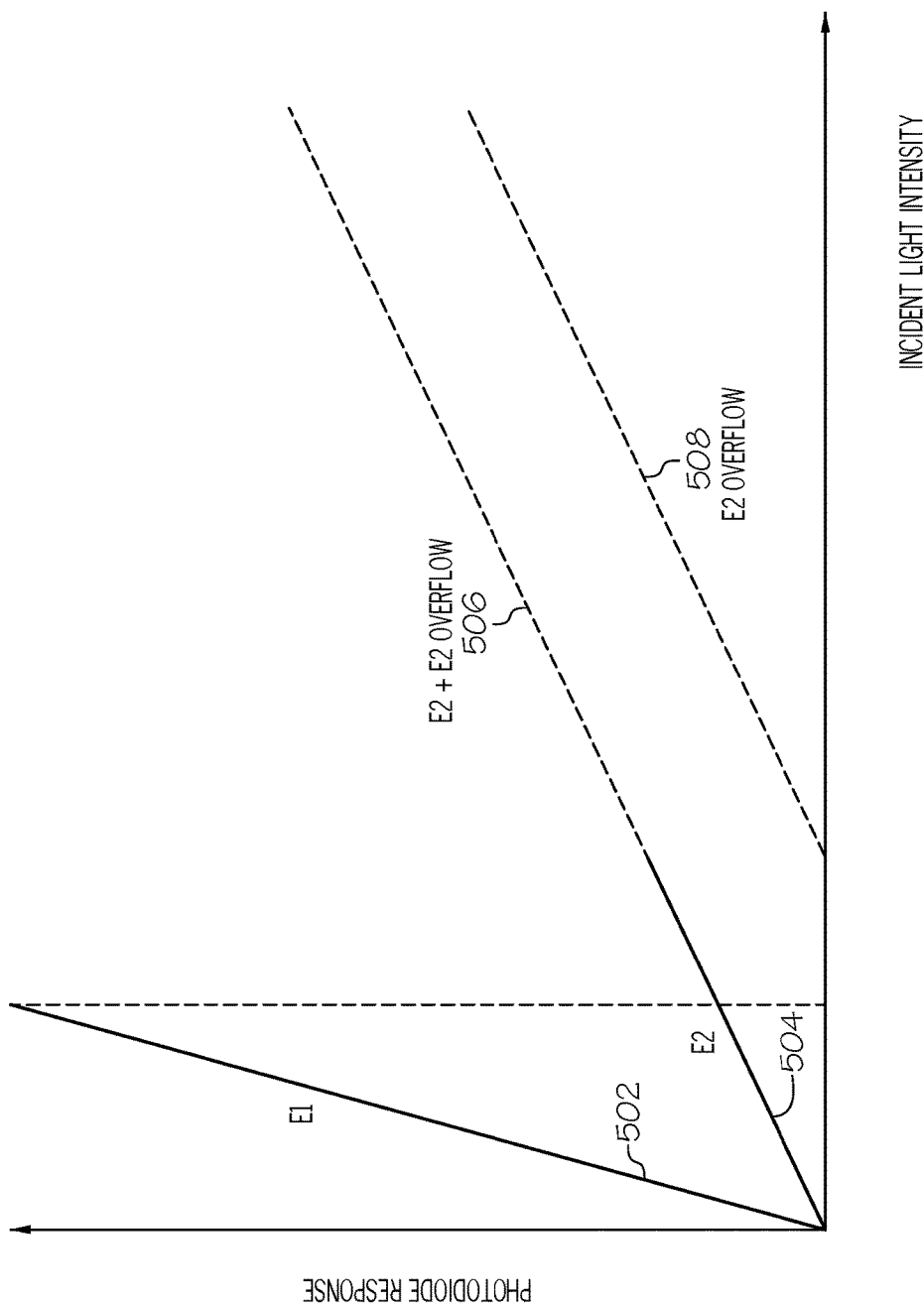
FIG. 5 is a graph of the dynamic range of nested sub-pixels with varying light sensitivities, specifically illustrating the response segments that may be captured when overflow charges from one of the photodiodes in a nested sub-pixel are stored in a separate storage region, in accordance with an embodiment.

FIG. 5 illustrates a graph of the dynamic range of nested sub-pixels with varying light sensitivities, specifically illustrating the response segments that may be captured when overflow charges from one of the photodiodes in a nested sub-pixel are stored in a storage region. As described above in connection with FIGS. 2-4, a photodiode in the inner sub-pixel of nested sub-pixels may have a lower sensitivity to incident light relative to the photodiode(s) in the outer sub-pixel or sub-pixel group of nested sub-pixels. The difference in sensitivity, as assumed above for the purposes of describing FIGS. 2-4 may be due primarily to the difference in the area of the light collecting region of the inner sub-pixel and the area of the light collecting region of the outer sub-pixel, with the inner sub-pixel (and photodiode in the inner sub-pixel) generally having a smaller light collecting region area than the outer sub-pixel or sub-pixel (and the photodiode(s) therein).

Line 502 may show the response E1 of the photodiode in the outer sub-pixel of nested sub-pixels, or the aggregate response of multiple photodiodes in the outer sub-pixel group of nested sub-pixels when the outer sub-pixel group includes more than one sub-pixel. Line 504 (i.e., the solid line marked with the reference numeral 504) may show the response of E2, where E2 represents the photodiode in the inner sub-pixel of nested sub-pixels. As is evident from FIG. 5, for any given intensity of incident light, the response E1 of the photodiode(s) in the outer sub-pixel or sub-pixel group is greater than the response E2 of the photodiode(s) in the inner sub-pixel. Line 506 (i.e., the dashed line marked with the reference numeral 506) may show the response of E2, the photodiode in the inner sub-pixel, that is combined with an overflow amount of charge (i.e., E2 OVERFLOW) that exceeds the full well capacity of the photodiode in the inner sub-pixel. Due to the smaller footprint of the inner sub-pixel relative to the outer sub-pixel or sub-pixel group, the inner sub-pixel may have a lower full well capacity relative to the full well capacity of the photodiode in the outer sub-pixel (or the aggregate full well capacity of the photodiodes in the outer sub-pixel group that include more than one sub-pixel).

While the photodiode in the inner sub-pixel may not be able to store charge for a response in excess of its full well capacity (i.e., beyond the height of the line 504 showing the response of E2), it may be desirable to store the overflow response 508 in another storage region when the capacity of the photodiode in the inner sub-pixel is exceeded. When the overflow response 508 is stored in a charge storage region that is separate from the photodiode in the inner sub-pixel, the response in the separate charge storage region may be generated only after the E2 response (i.e., the response of the photodiode in the inner sub-pixel) has reached the full well capacity of the photodiode in the inner sub-pixel.

Figure 6:
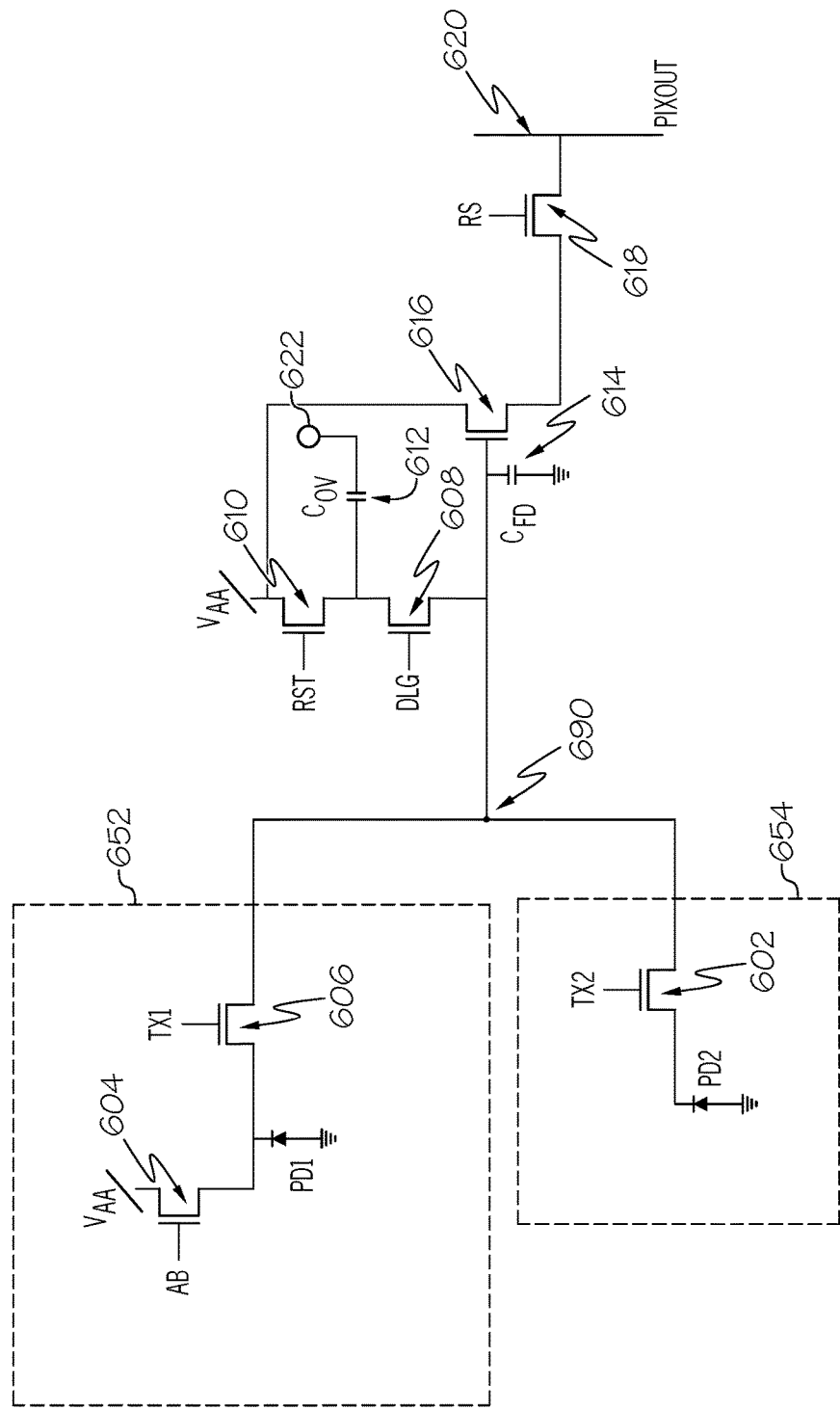
FIG. 6 is a diagram of a dual-photodiode pixel circuit that stores overflow charges in a separate storage region, thereby capturing the response segments of FIG. 5, in accordance with an embodiment.

FIG. 6 illustrates a pixel circuit that may achieve the overflow charge storage illustrated by line 508 of FIG. 5 by storing charges that overflow from the inner sub-pixel photodiode PD2 in an overflow capacitor Cov 612. One end of the overflow capacitor Cov 612 may be coupled to a node in between the serially connected reset and overflow charge transfer transistors 610 and 608, while the other end of the overflow capacitor Cov 612 may be connected to a fixed potential source 622. The fixed potential source 622 may be held/provided at the pixel supply voltage VAA, the pixel ground voltage, or any other suitable voltage. The inner sub-pixel photodiode circuit 654 may include the inner sub-pixel photodiode PD2 and an inner sub-pixel photodiode transfer transistor 602 that is controlled by the gate signal TX2. The inner sub-pixel photodiode circuit 654 may be coupled to a floating diffusion node 690 where the floating diffusion capacitance is represented by the floating diffusion capacitor Cfd 614. Also coupled to the floating diffusion node 690 may be an outer sub-pixel photodiode circuit 652. The outer sub-pixel photodiode circuit 652 may include an anti-blooming transistor 604 between the outer sub-pixel photodiode PD1 and the pixel voltage supply VAA. Coupled between the outer sub-pixel PD1 and the floating diffusion node 690, a transfer transistor 606 may be formed.

An overflow charge transfer transistor 608 may be coupled between the floating diffusion node 690 and a reset transistor 610. The gate terminal of a source-follower transistor 616 may also be coupled to the floating diffusion node 690. A first source-drain terminal of the source-follower transistor 616 may be coupled to the pixel voltage supply VAA, while a second source-drain terminal of the source-follower transistor 616 may be coupled to a row select transistor 618. Row select transistor 618 may be coupled between the second source-drain terminal of the source-follower transistor 616 and the pixel output line 620 (also labeled PIXOUT in FIG. 6). When multiple photodiodes are present in an inner or outer sub-pixel group, the photodiodes associated with the inner or outer sub-pixel group may be connected in parallel, in the place of PD2 or PD1, respectively. Alternatively, each of the photodiodes (such as those in the sub-pixels 404-1 through 404-8) may be provided with a respective transfer gate 606 and anti-blooming transistor 604. In other words, when an outer sub-pixel group includes multiple photodiodes, the outer photodiode transfer circuitry 652 may be duplicated for each of the photodiodes in the outer sub-pixel group, and connected in parallel. Similarly, whenever an inner sub-pixel group includes multiple photodiodes, the inner photodiode transfer circuitry 654 may be duplicated for each of the photodiodes in the inner sub-pixel group, and connected in parallel. Duplicating the inner photodiode transfer circuit 654 and the outer photodiode transfer circuit 652 for each of the photodiodes in the inner and outer sub-pixel groups, respectively, may allow for independent readout of each of the photodiodes in the inner or outer sub-pixel groups.

Figure 7:
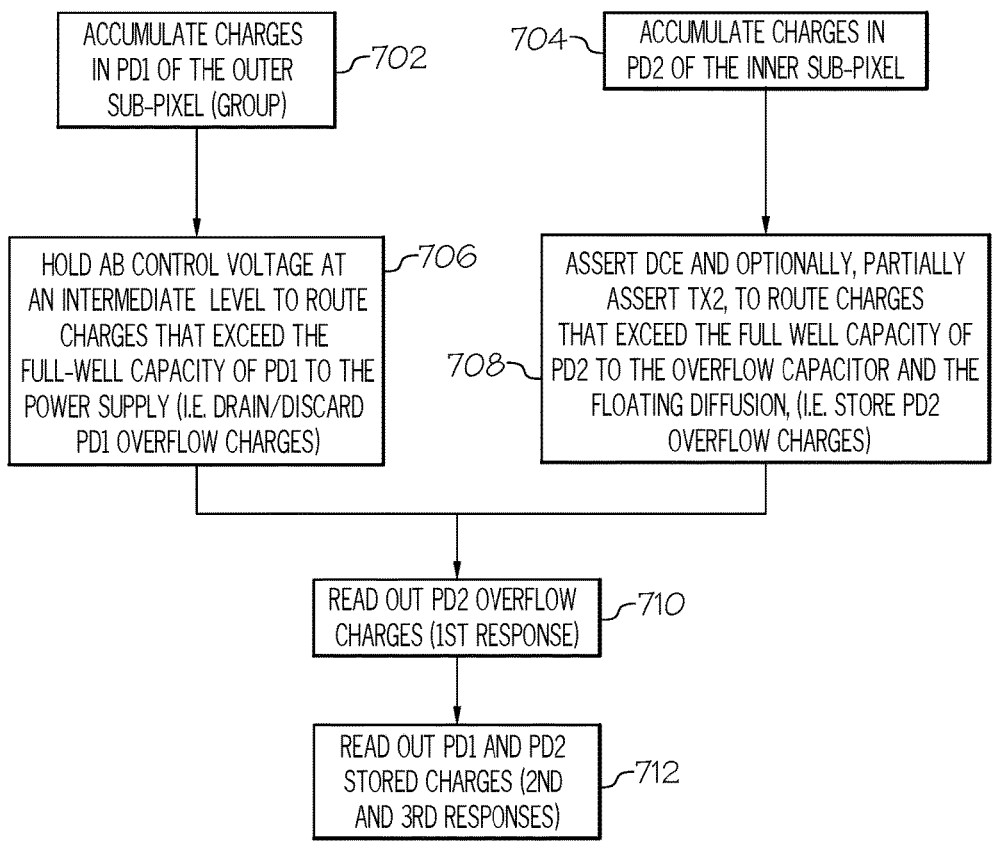
FIG. 7 is a flow chart of illustrative steps that may be performed to operate the pixel circuit of FIG. 6, in accordance with an embodiment.

The pixel circuit of FIG. 6 may be operated using the method illustrated in FIG. 7. In step 702 of FIG. 7, charges may be accumulated in the photodiode PD1 of the outer sub-pixel or sub-pixel group. As described above, when the outer sub-pixel group contains more than one sub-pixel (and consequently, more than one photodiode), it may be assumed for the sake of simplicity that the photodiodes of the more than one sub-pixel are connected in parallel, thereby effectively functioning as a single photodiode which is represented by PD1 in FIG. 6. However, as described above, the photodiode transfer circuits 652/654 may be duplicated and connected in parallel for each of the photodiodes in the outer/inner sub-pixel groups respectively, enabling each of said photodiodes to have its associated charges transferred and read out independently. Charges may be accumulated in step 702 in response to incident light hitting the light collecting area of the outer sub-pixel or sub-pixel group.

In step 704 of FIG. 7, charges may be accumulated in the photodiode PD2 of the inner sub-pixel. Charges may be accumulated in step 702 in response to incident light hitting the light collecting area of the inner sub-pixel. Steps 702 and 704 may occur simultaneously.

In step 706 of FIG. 7, the AB control voltage provided to the anti-blooming transistor 604 may be held at an intermediate voltage that is less than the pixel supply voltage VAA to route excess charges accumulated in PD1 after PD1 has accumulated an amount of charge equal to the full-well capacity of PD1 to the voltage supply terminal VAA which is coupled to the anti-blooming transistor 604. As an alternative to holding the anti-blooming transistor 604 gate at an intermediate voltage that is less than the pixel supply voltage VAA, the gate of transistor 604 may be periodically asserted to VAA (or an intermediate voltage less than VAA) and then de-asserted to the pixel ground voltage. The assertion of the AB control voltage provided to the anti-blooming transistor 604 to VAA or an intermediate voltage less than VAA may route the excess charges accumulated in the PD1 photodiode to the pixel voltage supply, thereby draining (i.e., discarding) these excess charges from the PD1 photodiode.

In step 708 of FIG. 7, the DCG control voltage provided to the overflow charge transfer capacitor 608 may be asserted while optionally, the TX2 voltage provided to the transfer transistor 602 is partially asserted (i.e., held at a voltage level that is less than the pixel supply voltage VAA) to route excess charges accumulated in PD2 after PD2 has accumulated an amount of charge equal to the full-well capacity of PD2 (i.e., the E2 OVERFLOW charges of FIG. 5) to the overflow capacitor Cov 612 and the floating diffusion node 609 (i.e., the capacitance Cfd 614). Alternatively, the TX2 voltage provided to transfer transistor 602 may be periodically asserted (to the pixel supply voltage level VAA or a voltage level that is below VAA) and then de-asserted to a pixel ground voltage. In some embodiments, a voltage greater than the pixel supply voltage VAA may be applied as the TX2 voltage (either constantly or periodically pulsed). The application of the TX2 voltage as a voltage that is either less than VAA, equal to VAA, or greater than VAA (constantly, or periodically pulsed) may be referred to as setting an overflow threshold for the transistor 602. In this way, the excess PD2 charges are not discarded as the excess PD1 charges are in step 706, but are rather stored in the Cov capacitor 612 and the Cfd capacitor 614 (i.e., the overflow charges are spread between the floating diffusion capacitor 614 and the overflow capacitor 612). Steps 706 and 708 may be performed simultaneously with steps 702 and 704, respectively.

At step 710, which occurs subsequent to steps 702-708, the PD2 overflow charges stored in the Cov capacitor 612 and the floating diffusion capacitance Cfd 614 may be read out. Read out of the charges stored in the Cov capacitor 612 and the floating diffusion capacitance Cfd 614 may occur by asserting the RS gate control signal provided to the row-select transistor 618 while the overflow charge transfer capacitor 608 gate control signal DCG is also asserted. During the read out of step 710, the gate voltages TX1 and TX2 may be deasserted. After the read out of step 710 (i.e., after the row-select transistor 618 gate control RS has been asserted, thereby reading out a signal proportional to the charge on the Cov capacitor 612 and the Cfd capacitor 614), the RST gate control signal provided to the reset transistor 610 may be asserted, thereby resetting the Cov capacitor 612 and the Cfd capacitor 614. The readout of step 710 may correspond to a first response segment such as the E2 overflow response 508 of FIG. 5.

At step 712, the respective charges stored in PD1 and PD2 may be read out. The order in which the charges stored in PD1 and PD2 are read out may vary. Specifically, in certain embodiments the charges stored in PD1 may be read out before the charges in PD2 are read out, whereas in other embodiments the charges stored in PD2 may be read out before the charges in PD1 are read out. Read out of the charges of PD1 or PD2 may be achieved by asserting the gate control signal for the transfer transistor associated with PD1 or PD2 (i.e., asserting TX1 for the read out of PD1, and asserting TX2 for the read out of PD2) while deasserting the DCG control signal provided to transistor 608, thereby routing the charges from PD1 or PD2 to the floating diffusion node 690 (or equivalently, the Cfd capacitor 614). Read out of the PD1 or PD2 charges stored in the floating diffusion capacitance Cfd 614 may occur by asserting the RS gate control signal provided to the row-select transistor 618 while the overflow charge transfer capacitor 608 gate control signal DCG is deasserted. After the read out of each of the PD1 stored charges and the PD2 stored charges in step 712 (i.e., after the row-select transistor 618 gate control RS has been asserted, thereby reading out a signal proportional to the charge on the Cfd capacitor 614 for each of the PD1 and PD2 stored charges), the RST gate control signal provided to the reset transistor 610 may be asserted, thereby resetting the Cfd capacitor 614. The read out in step 712 may correspond to second and third response segments such as the E1 response 502 and the E2 response 504 of FIG. 5.

Figure 8:
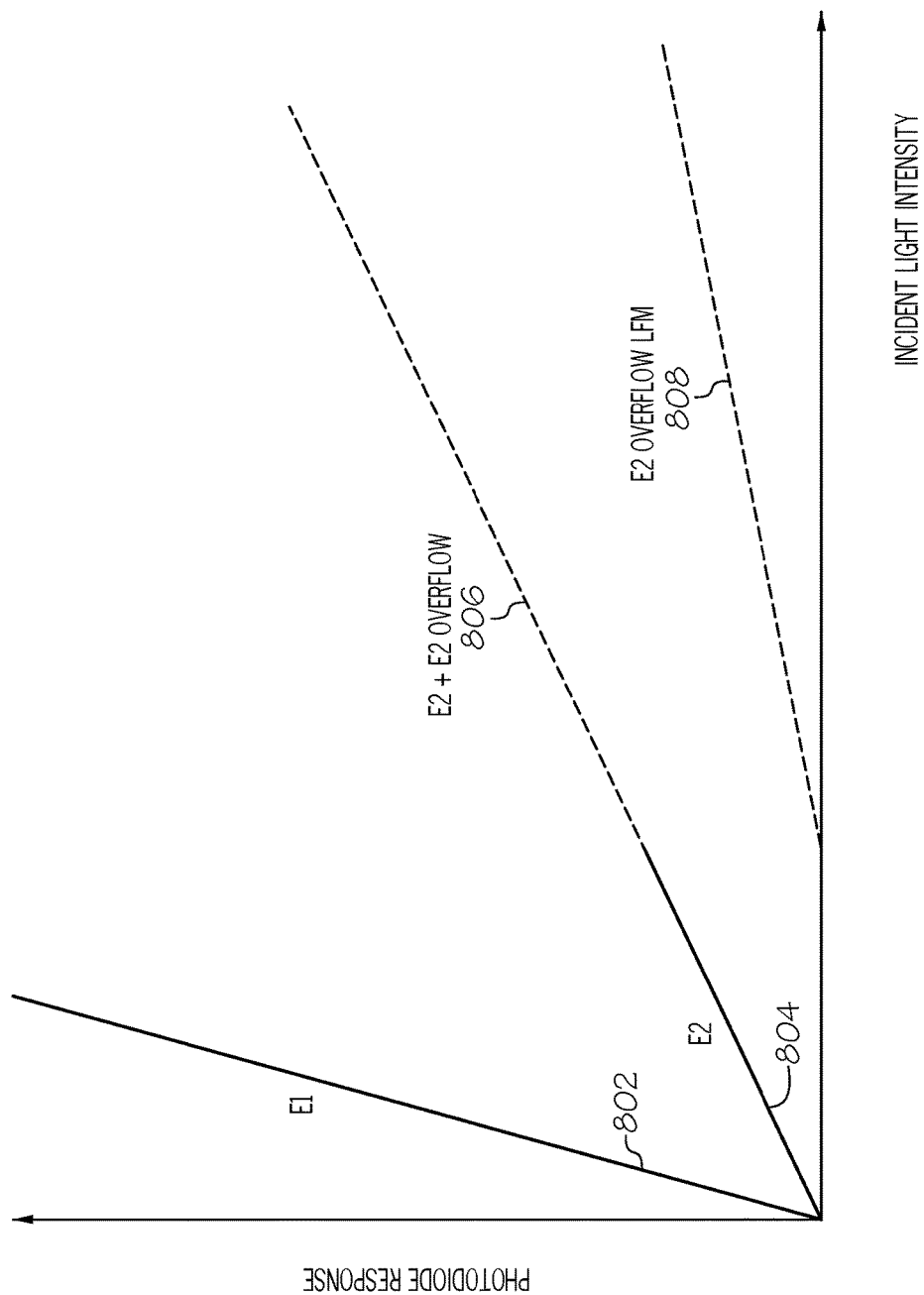
FIG. 8 is a graph of the dynamic range of nested sub-pixels with varying light sensitivities, specifically illustrating the response segments that may be captured when overflow charges from one of the photodiodes in a nested sub-pixel are stored using a flicker mitigation timing scheme, in accordance with an embodiment.

FIG. 8 illustrates a graph of the dynamic range of nested sub-pixels with varying light sensitivities, specifically illustrating the response segments that may be captured when overflow charges from one of the photodiodes in a nested sub-pixel are stored using a flicker mitigation timing scheme. As described above in connection with FIGS. 2-4, a photodiode in the inner sub-pixel of nested sub-pixels may have a lower sensitivity to incident light relative to the photodiode(s) in the outer sub-pixel or sub-pixel group of nested sub-pixels. The difference in sensitivity, as assumed above for the purposes of describing FIGS. 2-4 may be due primarily to the difference in the area of the light collecting region of the inner sub-pixel and the area of the light collecting region of the outer sub-pixel, with the inner sub-pixel (and photodiode in the inner sub-pixel) generally having a smaller light collecting region area than the outer sub-pixel or sub-pixel (and the photodiode(s) therein).

Line 802 may show the response E1 of the photodiode in the outer sub-pixel of nested sub-pixels, or the aggregate response of multiple photodiodes in the outer sub-pixel group of nested sub-pixels when the outer sub-pixel group includes more than one sub-pixel. Line 804 (i.e., the solid line marked with the reference numeral 804) may show the response of E2, where E2 represents the photodiode in the inner sub-pixel of nested sub-pixels. As is evident from FIG. 8, for any given intensity of incident light, the response E1 of the photodiode(s) in the outer sub-pixel or sub-pixel group is greater than the response E2 of the photodiode(s) in the inner sub-pixel. Line 806 (i.e., the dashed line marked with the reference numeral 806) may show the response of E2, where E2 representes the photodiode in the inner sub-pixel that is combined with an overflow amount of charge (i.e., E2 OVERFLOW) that exceeds the full well capacity of the photodiode in the inner sub-pixel. The E2 OVERFLOW line 806 may correspond to the non-attenuated excess charge that would be accumulated in the photodiode of the inner sub-pixel, given a higher well capacity for said photodiode. Due to the smaller footprint of the inner sub-pixel relative to the outer sub-pixel or sub-pixel group, the inner sub-pixel may have a lower full well capacity relative to the full well capacity of the photodiode in the outer sub-pixel (or the aggregate full well capacity of the photodiodes in the outer sub-pixel group that include more than one sub-pixel).

While the photodiode in the inner sub-pixel may not be able to store charge for a response in excess of its full well capacity (i.e., beyond the height of the line for the response 804 of E2), it may be desirable to store a portion 808 of the overflow response (i.e., a portion of E2 OVERFLOW, labeled E2 OVERFLOW LFM) in another storage region when the capacity of the photodiode in the inner sub-pixel is exceeded. The portion of the overflow response 808 may be proportional to the actual overflow response 806 (E2 OVERFLOW). Specifically, the portion of the overflow response 808 may be equivalent to the actual overflow response E2 OVERFLOW scaled by a flicker mitigation constant (described in more detail in connection with the timing diagram of FIG. 9B). The portion of the overflow response 808 (i.e., E2 OVERFLOW LFM), being scaled by a flicker mitigation constant, may also be referred to as a scaled overflow response 808. When the scaled overflow response 808 is stored in a charge storage region that is separate from the photodiode in the inner sub-pixel, the response in the separate charge storage region may be generated only after the response of E2 (i.e., the response of the photodiode in the inner sub-pixel) has reached the full well capacity of the photodiode in the inner sub-pixel.

Figure 9A:
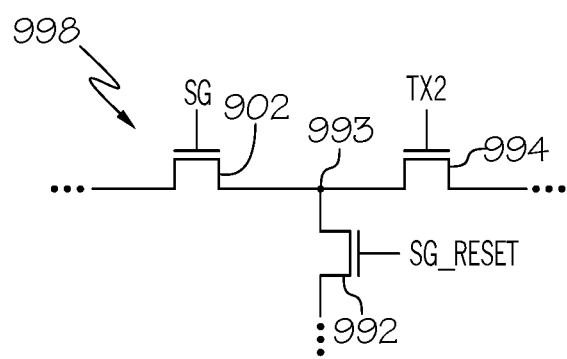
FIG. 9A is a diagram of an illustrative coupled gate structure circuit in accordance with an embodiment.

FIG. 9A is a diagram of an illustrative coupled gate structure circuit in that may be included in the pixel circuitry for nested sub-pixels to capture a scaled overflow response. Coupled gate structure 998 may include a storage gate transistor 902 (sometimes referred to herein as a threshold transistor or a storage gate), a storage node 993 (sometimes referred to herein as a temporary storage node), a transfer transistor 994, and a storage node reset transistor 992. Storage gate 902 may be coupled to a photodiode or to a storage node other than storage node 993. Storage node 993 may be a pinned storage node that is fully depletable (e.g., all charge may be removed from storage node 993 during charge transfer). The coupled gates may function as a charge coupled device structure. Storage node reset transistor 992 may be coupled to a pixel voltage supply or to a storage node other than storage node 993. Transfer transistor 994 may be coupled to a floating diffusion node or to a storage node other than storage node 993.

During charge accumulation in the photodiode of the pixel, storage gate 902 may receive a signal SG that is at an intermediate voltage level in order to allow some, but not all, charge to overflow from the photodiode or from a storage node through storage gate 902 to temporary storage node 993. Transfer transistor 994 and storage node reset transistor 992 may receive alternating signals TX2 and SG_RESET, such that overflow charges in temporary storage node 993 are passed either through transfer transistor 994 or through storage node reset transistor 992.

Figure 9B:
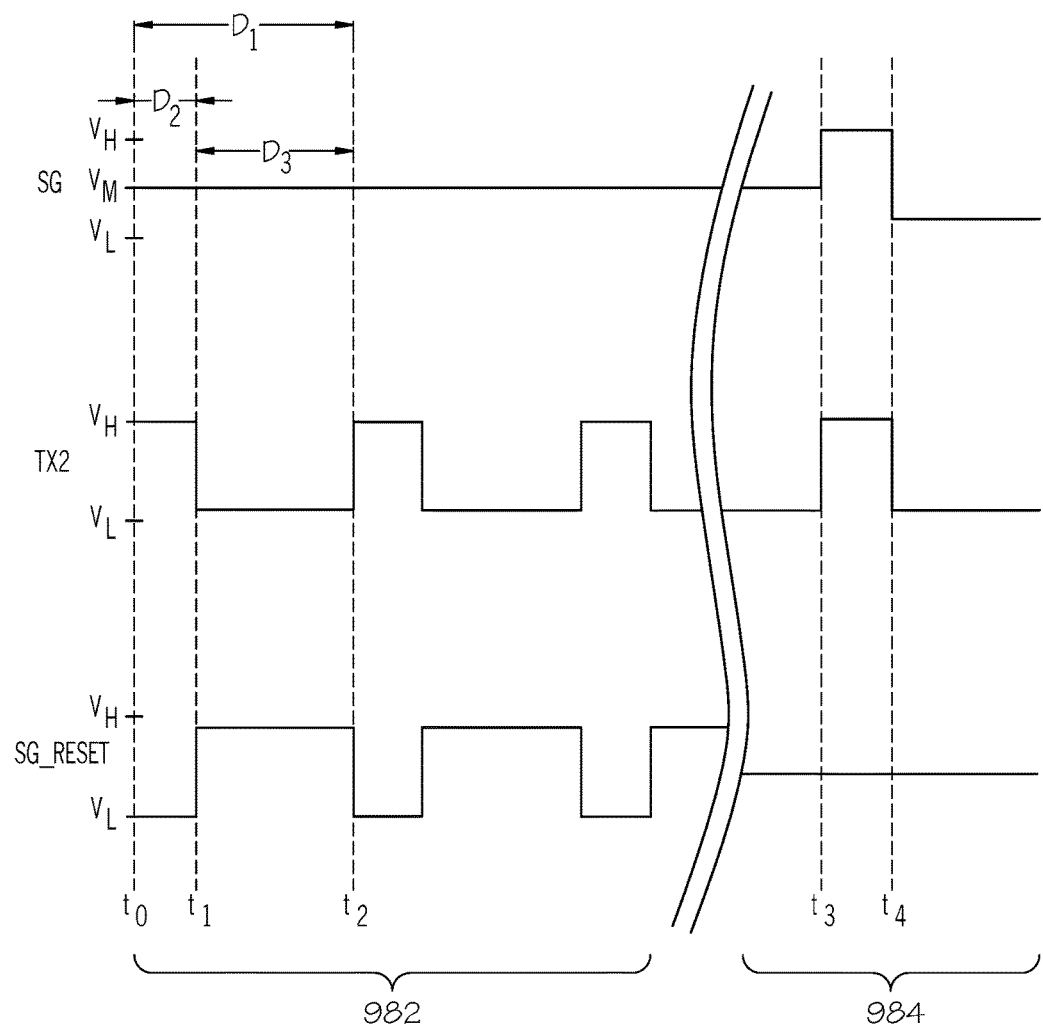
FIG. 9B is a timing diagram showing relevant signal behavior in an illustrative 3-transistor coupled gate structure in accordance with an embodiment.

FIG. 9B is a timing diagram showing relevant signal behavior that may be used in coupled gate structure 998 of FIG. 9A/9C for overflow charge routing and non-overflow charge transfer. Region 982 of the timing diagram represents signal behavior during a portion of the charge accumulation period of a pixel photodiode. During the charge accumulation period, signal SG may be held at intermediate voltage level $V_M$, while signals TX and SG_RESET may alternate between respective low and high voltage levels $V_L$ and $V_H$. It should be noted that signal SG_RESET may be at a low voltage whenever signal TX is at a high voltage and vice-versa. In other words, signals SG_RESET and TX may have alternating waveforms during charge accumulation. For example, from time $t_0$ to $t_1$ (i.e., the duration D2), signal TX is at $V_H$ and signal SG_RESET is at $V_L$. From time $t_1$ to $t_2$ (i.e., the duration D3), signal TX is at $V_L$ and signal SG_RESET is at $V_H$. The durations D2 and D3 may sum to the period of the signal behavior (i.e., duration D1). The duty cycle of the TX (i.e., the ratio D2/D1) and the duty cycle of the SG_RESET signal (i.e., the ratio D3/D1) may be altered based on the proportion of overflow charges desired to be routed to either of the two paths (i.e., either through the transistor 994 or through the transistor 992, respectively). The duty cycle may, for example, be set such that signal TX is on/asserted for approximately 12.5% of the period D1 (i.e., D2/D1 is 0.125) and signal SG_RESET is on for approximately 87.5% of the period D1 (i.e., D3/D1 is 0.875). It should be noted that, during charge integration, signal TX and signal SG_RESET may be complementary signals or, if desired, there may be periods of time between assertions of signal TX and signal SG_RESET in which both signals are deasserted.

The inverse of the ratio D2/D1 (i.e., D1/D2), or the inverse of the duty cycle of the TX signal, may be referred to as the flicker mitigation constant in connection with the scaled response 808 of FIG. 8, and may be adjustable during operation of the image pixel. Specifically, the E2 OVERFLOW LFM scaled overflow response 808 may be equal to the E2 OVERFLOW response curve 806 divided by the flicker mitigation constant (i.e., divided by D1/D2, or multiplied by D2/D2). In the example where the duty cycle for the TX signal is set to 12.5% of the period D1 (i.e., D2/D1 is 0.125), the E2 OVERFLOW LFM scaled overflow response curve 808 may be equal to the E2 OVERFLOW curve 806 divided by 8, or multiplied by 0.125.

Portion 984 of the timing diagram represents signal behavior when non-overflow charges are transferred from the photodiode to storage. Portion 984 may occur after the read out of overflow signals from the pixel. From time $t_3$ to time $t_4$, signals SG and TX may be at $V_H$, while signal SG_RESET is held low, such that non-overflow charge from the photodiode is only transferred along one desired path (e.g., through transfer transistor 994 in FIG. 9A). The respective intervals during which the signals TX2 and SG_RESET are asserted may be non-overlapping. For example, the duration D2 may be non-overlapping with the duration D3. In other words, whenever the signal TX2 is asserted, the signal SG_RESET may be deasserted, and whenever the signal SG_RESET is asserted, the signal TX2 may be deasserted.

Figure 9C:
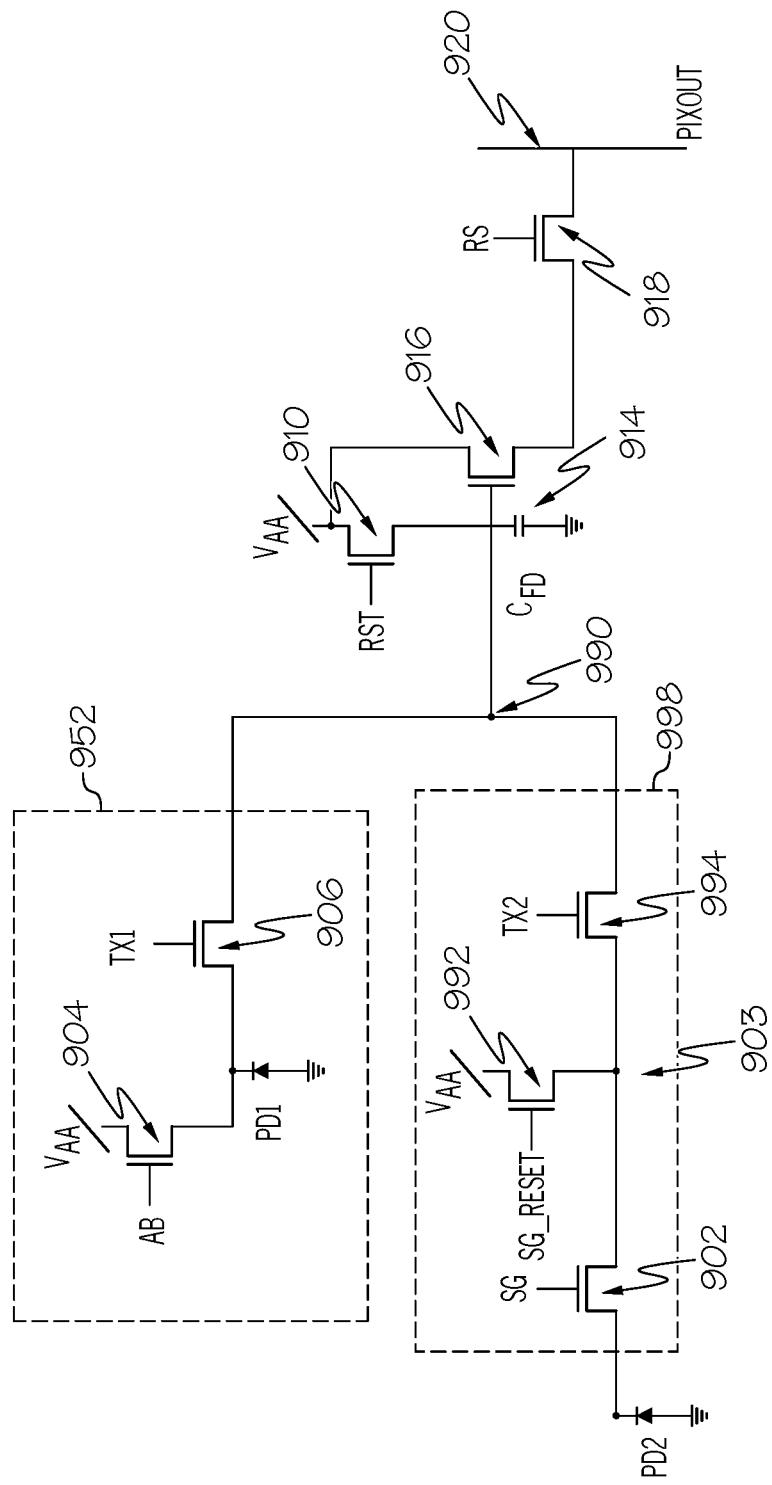
FIG. 9C is a diagram of a dual-photodiode pixel circuit that includes the coupled gate structure circuit of FIG. 9A, in accordance with an embodiment.

FIG. 9C illustrates an exemplary pixel circuit that may capture three response segments 802, 804, and 808 of FIG. 8 using two photodiodes. The outer sub-pixel photodiode circuit 952 of FIG. 9C may be operated in the manner described above in connection with the outer sub-pixel photodiode circuit 652 of FIG. 6. The photodiode PD2 in the inner sub-pixel may be coupled to the coupled gate structure 998 of FIG. 9A, which may be operated in the manner described above in connection with FIG. 9B. Transfer transistor 994 may be used (during the interval D2) to route charges to a floating diffusion node 990 which has a capacitance represented by capacitor Cfd 914. A reset transistor 910 may be coupled to the floating diffusion node 990 and may be used to reset the charges on the capacitor Cfd 914 between read out operations. Pixel response segments may be read out when charges are routed to the floating diffusion node 990 which is coupled to the gate terminal of the source follower transistor 916, which may have a first source-drain terminal coupled to the pixel voltage supply VAA and a second source-drain terminal coupled to the row select transistor 918. The voltage produced at the second source-drain terminal of the source follower transistor 916 may be read out on the pixel output line PIXOUT 920 when the RS signal provided to the row select transistor 918 is asserted.

When multiple photodiodes are present in an inner or outer sub-pixel group, the photodiodes associated with the inner or outer sub-pixel group may be connected in parallel, in the place of PD2 or PD1, respectively. Alternatively, each of the photodiodes (such as those in the sub-pixels 404-1 through 404-8) may be provided with a respective transfer gate 906 and anti-blooming transistor 904. In other words, when an outer sub-pixel group includes multiple photodiodes, the outer photodiode transfer circuitry 952 may be duplicated for each of the photodiodes in the outer sub-pixel group, and connected in parallel. Similarly, whenever an inner sub-pixel group includes multiple photodiodes, the inner coupled gate structure 998 and the photodiode may be duplicated for each of the photodiodes in the inner sub-pixel group, and connected in parallel. Duplicating the coupled gates structure 998 with the photodiode, and the outer photodiode transfer circuit 952 for each of the photodiodes in the inner and outer sub-pixel groups, respectively, may allow for independent readout of each of the photodiodes in the inner or outer sub-pixel groups.

Figure 10:
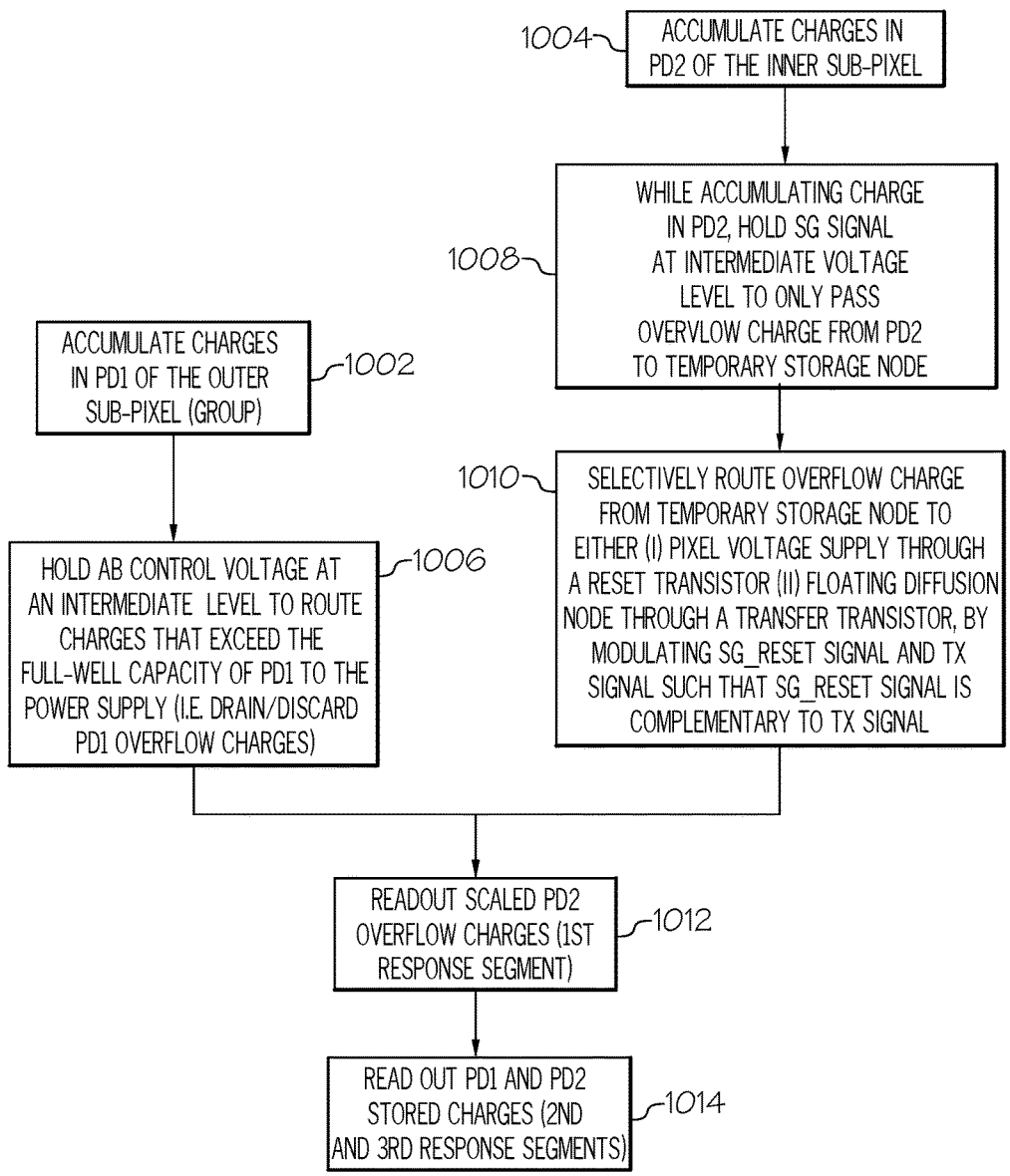
FIG. 10 is a flow chart of illustrative steps that may be performed to operate the pixel circuit of FIG. 9C, in accordance with an embodiment.

The pixel circuit of FIG. 9C may be operated using the method illustrated in FIG. 10. In step 1002 of FIG. 10, charges may be accumulated in the photodiode PD1 of the outer sub-pixel or sub-pixel group. As described above, when the outer sub-pixel group contains more than one sub-pixel (and consequently, more than one photodiode), it may be assumed for the sake of simplicity that the photodiodes of the more than one sub-pixel are connected in parallel, thereby effectively functioning as a single photodiode which is represented by PD1 in FIG. 9C. However, as described above, the photodiode transfer circuits 952 and the coupled gates structure 998 with the photodiode PD2 may be duplicated and connected in parallel for each of the photodiodes in the outer/inner sub-pixel groups respectively, enabling each of said photodiodes to have its associated charges transferred and read out independently. Charges may be accumulated in step 1002 in response to incident light hitting the light collecting area of the outer sub-pixel or sub-pixel group.

In step 1004 of FIG. 10, charges may be accumulated in the photodiode PD2 of the inner sub-pixel. Charges may be accumulated in step 1002 in response to incident light hitting the light collecting area of the inner sub-pixel. Steps 1002 and 1004 may occur simultaneously.

In step 1006 of FIG. 10, the AB control voltage provided to the anti-blooming transistor 904 may be held at an intermediate voltage that is less than the pixel supply voltage VAA to route excess charges accumulated in PD1 after PD1 has accumulated an amount of charge equal to the full-well capacity of PD1 to the voltage supply terminal VAA which is coupled to the anti-blooming transistor 904. As an alternative to holding the anti-blooming transistor 904 gate at an intermediate voltage that is less than the pixel supply voltage VAA, the gate of transistor 904 may be periodically asserted to VAA (or an intermediate voltage less than VAA) and then de-asserted to the pixel ground voltage. The assertion of the AB control voltage provided to the anti-blooming transistor 904 to VAA or an intermediate voltage less than VAA may route the excess charges accumulated in the PD1 photodiode to the pixel voltage supply, thereby draining (i.e., discarding) these excess charges from the PD1 photodiode.

Steps 1008 and 1010 may be performed for selectively routing overflow charge while charge is accumulating in the photodiode PD2, in accordance with the timing diagram of FIG. 9B. In step 1008, signal SG may be held at an intermediate voltage level (either constantly, or periodically pulsed) such that overflow charge is allowed to pass from photodiode PD2 through storage gate 902 to temporary storage node 993. In some embodiments, a voltage greater than or equal to the pixel supply voltage VAA may be applied as the SG voltage (either constantly or periodically pulsed). The application of the SG voltage as a voltage that is either less than VAA, equal to VAA, or greater than VAA (constantly, or periodically pulsed) may be referred to as setting an overflow threshold for the storage gate transistor 902.

In step 1010, overflow charge may be selectively routed from temporary storage node 993 either to pixel voltage supply VAA through storage gate reset transistor 992 (in an interval D3 as shown in FIG. 9B) or to floating diffusion node 990 through transfer transistor 994 (in an interval D2 as shown in in FIG. 9B). This selective routing may be performed by modulating signal SG_RESET and signal TX such that the two signals alternate (e.g., when SG_RESET is high, TX is low, and vice versa) as illustrated in FIG. 9B.

Because overflow charges are routed to the floating diffusion node 990 only during periodic intervals D2, the PD2 overflow charges at floating diffusion node 990 may be referred to as scaled overflow charges. Specifically, the amount of overflow charge transferred to the floating diffusion node 990 may be scaled by the LFM ratio D2/D1, such that D2/D1 multiplied by the total overflow charge is present at the floating diffusion node after step 1010. At step 1012, these scaled overflow charges may be read out. Read out of the charges stored in the floating diffusion capacitance Cfd 914 (i.e., the floating diffusion node 990) may occur by asserting the RS gate control signal provided to the row-select transistor 918. During the read out of step 1012, the gate voltages TX1 and TX2 may be deasserted. After the read out of step 1012 (i.e., after the row-select transistor 918 gate control RS has been asserted, thereby reading out a signal proportional to the charge on the Cfd capacitor 914), the RST gate control signal provided to the reset transistor 910 may be asserted, thereby resetting the Cfd capacitor 914. The readout of step 1012 may correspond to a first response segment such as the scaled E2 overflow response 808 of FIG. 8.

At step 1014, the respective charges stored in PD1 and PD2 may be read out. The order in which the charges stored in PD1 and PD2 are read out may vary. Specifically, in certain embodiments the charges stored in PD1 may be read out before the charges in PD2 are read out, whereas in other embodiments the charges stored in PD2 may be read out before the charges in PD1 are read out. Read out of the charges of PD1 or PD2 may be achieved by asserting the gate control signal for the transfer transistor associated with PD1 or PD2 (i.e., asserting TX1 for the read out of PD1, and asserting TX2 for the read out of PD2) while deasserting the DCG control signal provided to transistor 908, thereby routing the charges from PD1 or PD2 to the floating diffusion node 990 (or equivalently, the Cfd capacitor 914). Read out of the PD1 or PD2 charges stored in the floating diffusion capacitance Cfd 914 may occur by asserting the RS gate control signal provided to the row-select transistor 918. After the read out of each of the PD1 stored charges and the PD2 stored charges in step 1014 (i.e., after the row-select transistor 918 gate control RS has been asserted, thereby reading out a signal proportional to the charge on the Cfd capacitor 914 for each of the PD1 and PD2 stored charges), the RST gate control signal provided to the reset transistor 910 may be asserted, thereby resetting the Cfd capacitor 914. The read out in step 1014 may correspond to second and third response segments such as the E1 response 802 and the E2 response 804 of FIG. 8.

Figure 11A:
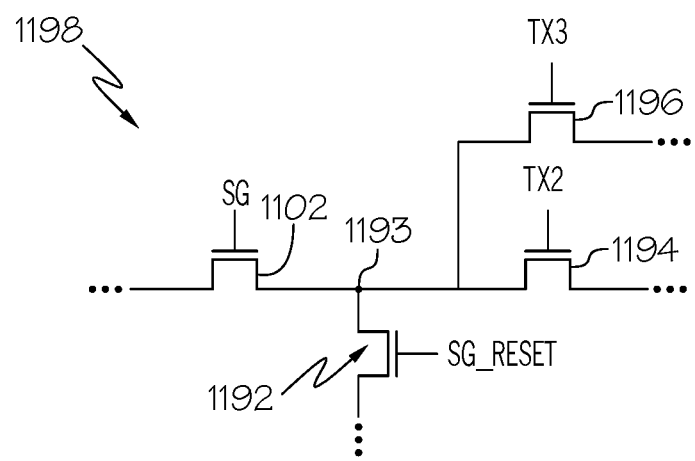
FIG. 11A is a diagram of an illustrative 4-transistor coupled gate structure circuit in accordance with an embodiment.

FIG. 11A is a diagram of an illustrative four-transistor coupled gate structure circuit in that may be included in the pixel circuitry for nested sub-pixels to capture multiple scaled overflow responses. Coupled gate structure 1198 may include a storage gate transistor 1102 (sometimes referred to herein as a threshold transistor or a storage gate), a storage node 1193 (sometimes referred to herein as a temporary storage node), a first transfer transistor 1194, a second transfer transistor 1196, and a storage node reset transistor 1192. Storage gate 1102 may be coupled to a photodiode or to a storage node other than storage node 1193. Storage node 1193 may be a pinned storage node that is fully depletable (e.g., all charge may be removed from storage node 1193 during charge transfer). The coupled gates may function as a charge coupled device structure. Storage node reset transistor 1192 may be coupled to a pixel voltage supply or to a storage node other than storage node 1193. Transfer transistor 1194 may be coupled to a floating diffusion node or to a storage node other than storage node 1193.

During charge accumulation in the photodiode of the pixel, storage gate 1102 may receive a signal SG that is at an intermediate voltage level in order to allow some, but not all, charge to overflow from the photodiode or from a storage node through storage gate 1102 to temporary storage node 1193. First transfer transistor 1194, second transfer transistor 1196, and storage node reset transistor 1192 may receive alternating signals TX2, TX3, and SG_RESET, such that overflow charges in temporary storage node 1193 are passed either through first transfer transistor 1194, second transfer transistor 1196, or through storage node reset transistor 1192.

Figure 11B:
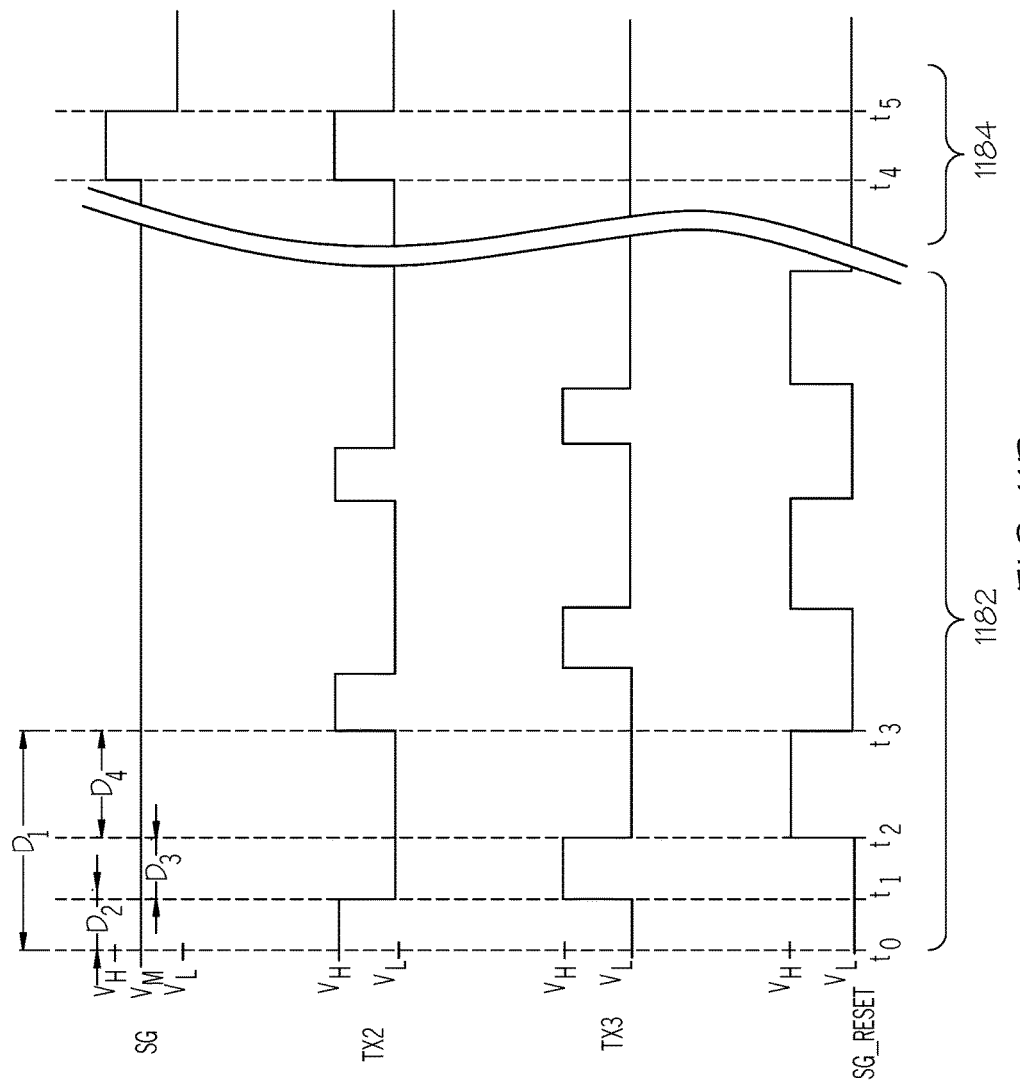
FIG. 11B is a timing diagram showing relevant signal behavior in an illustrative 4-transistor coupled gate structure in accordance with an embodiment.

FIG. 11B is a timing diagram showing relevant signal behavior that may be used in coupled gate structure 1198 of FIG. 11A/11C for overflow charge routing and non-overflow charge transfer. Region 1182 of the timing diagram represents signal behavior during a portion of the charge accumulation period of a pixel photodiode. During the charge accumulation period, signal SG may be held at intermediate voltage level $V_M$, while signals TX2, TX3, and SG_RESET may alternate between respective low and high voltage levels $V_L$ and $V_H$. It should be noted that signal SG_RESET may be at a low voltage whenever either of the signals TX2 or TX3 are at a high voltage. Similarly, TX2 may be at a low voltage whenever either of the signals SG_RESET or TX3 are at a high voltage. Finally, TX3 may be at a low voltage whenever either of the signals SG_RESET or TX2 are at a high voltage. Moreover, the intervals in which TX2 is at a high voltage (such as interval D2) may be non-overlapping with the intervals in which SG_RESET is at a high voltage (such as interval D4) and intervals in which TX3 is at a high voltage (such as interval D3). The intervals in which TX3 is at a high voltage (such as interval D3) may be non-overlapping with the intervals in which SG_RESET is at a high voltage (such as interval D4) and intervals in which TX2 is at a high voltage (such as interval D2). The intervals in which SG_RESET is at a high voltage (such as interval D4) may be non-overlapping with the intervals in which TX2 is at a high voltage (such as interval D2) and intervals in which TX3 is at a high voltage (such as interval D3).

In other words, signals SG_RESET, TX2, and TX3 may have alternating waveforms during charge accumulation. For example, from time $t_0$ to $t_1$ (i.e., the duration D2), signal TX2 is at $V_H$, while signal SG_RESET is at $V_L$ and signal TX3 is also at $V_L$. From time $t_1$ to $t_2$ (i.e., the duration D3), signal TX3 is at $V_H$, while signal SG_RESET is at $V_L$ and signal TX2 is also at $V_L$. From time $t_3$ to $t_4$ (i.e., the duration D4), signal SG_RESET is at $V_H$ while signal TX2 is at $V_L$ and signal TX3 is also at $V_L$. The durations D2, D3, D4 may sum to the period of the signal behavior (i.e., duration D1). The duty cycle of the TX2 signal (i.e., the ratio D2/D1), the duty cycle of the TX3 signal (i.e., the ratio D3/D1), and the duty cycle of the SG_RESET signal (i.e., the ratio D4/D1) may be altered based on the proportion of overflow charges desired to be routed to either of the three paths (i.e., either through the first transfer transistor 1194, the second transfer transistor 1196, or the reset transistor 1192, respectively). The duty cycle may, for example, be set such that signal TX2 is on/asserted for approximately 12.5% of the period D1 (i.e., D2/D1 is 0.125), signal TX3 is on/asserted for approximately 25% of the period D1 (i.e., D3/D1 is 0.25) and signal SG_RESET is on for approximately 62.5% of the period D1 (i.e., D4/D1 is 0.625). It should be noted that, during charge integration, signals TX2, TX3, and SG_RESET may be complementary signals or, if desired, there may be periods of time between assertions of signals TX2, TX3, and SG_RESET in which all three of the signals are deasserted.

The ratio D2/D1, or the duty cycle of the TX2 signal, may be referred to as the inverse of the first flicker mitigation constant (or, the first LFM ratio) of the pixel circuit, and may be adjustable during operation of the image pixel. The ration D3/D1, or the duty cycle of the TX3 signal, may be reffered to as the inverse of the second flicker mitigation constant of the pixel circuit, and may also be adjustable during operation of the image pixel. Portion 1184 of the timing diagram represents signal behavior when non-overflow charges are transferred from the photodiode to storage. Portion 1184 may occur after the read out of overflow signals from the pixel. From time $t_4$ to time $t_5$, signals SG and TX2 may be at $V_H$, while signal SG_RESET is held low, such that non-overflow charge from the photodiode is only transferred along one desired path (e.g., through transfer transistor 1194 in FIG. 11A). The respective intervals during which the signals TX2, TX3, and SG_RESET are asserted may be non-overlapping. For example, the durations D2, D3, and D4 may be non-overlapping with one another. In other words, whenever the signal TX2 is asserted, the signals TX3 and SG_RESET may be deasserted, whenever the signal SG_RESET is asserted, the signals TX2 and TX3 may be deasserted, and whenever the signal TX3 is asserted, the signals TX2 and SG_RESET may be deasserted.

Figure 11C:
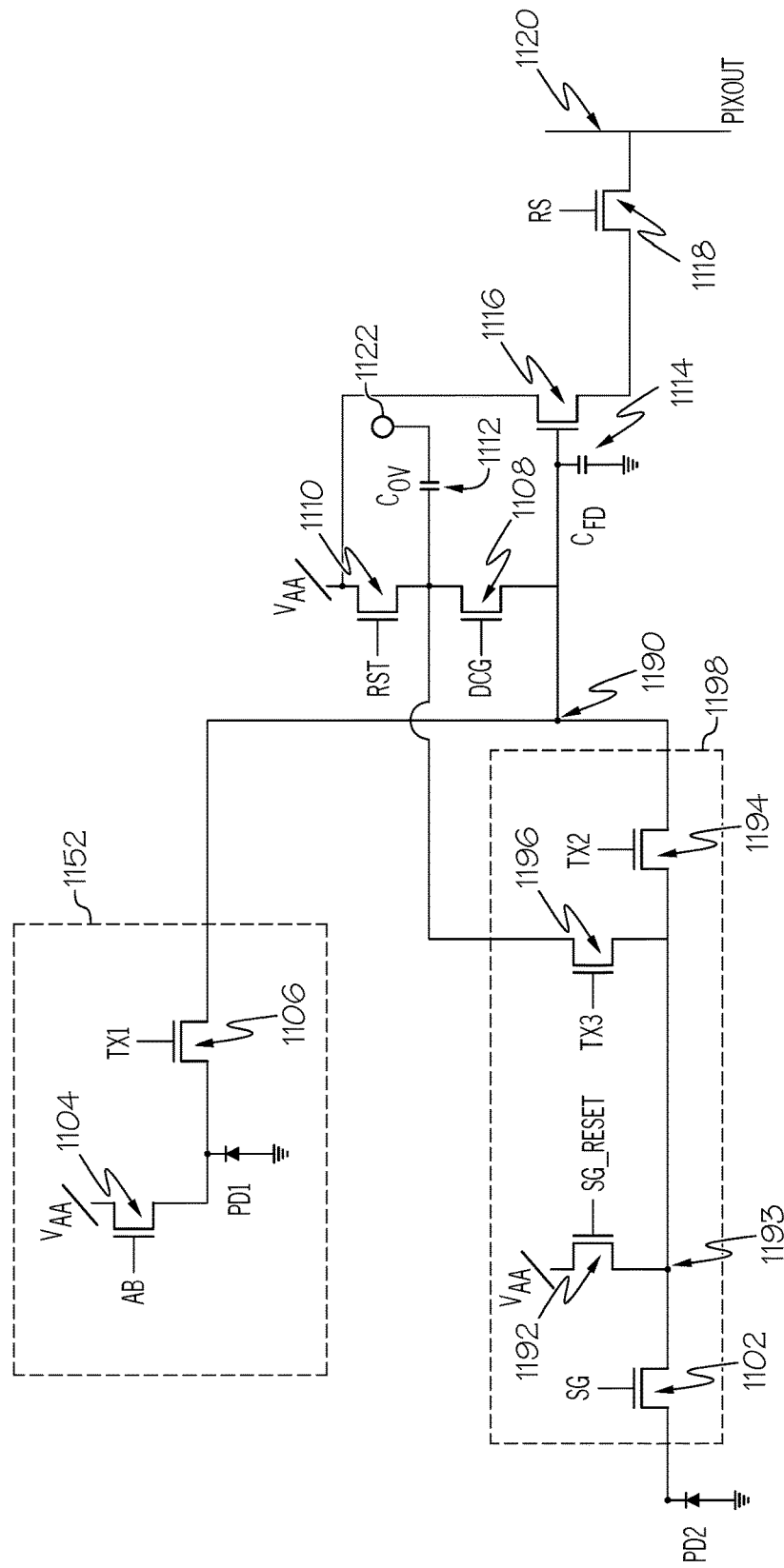
FIG. 11C is a diagram of a dual-photodiode pixel circuit that includes the coupled gate structure circuit of FIG. 11A, in accordance with an embodiment.

FIG. 11C illustrates an exemplary pixel circuit that may capture four response segments using two photodiodes. The outer sub-pixel photodiode circuit 1152 of FIG. 11C may be operated in the manner described above in connection with the outer sub-pixel photodiode circuit 652/952 of FIGS. 6 and 9C. The photodiode PD2 in the inner sub-pixel may be coupled to the coupled gate structure 1198 of FIG. 11A, which may be operated in the manner described above in connection with FIG. 11B. A first transfer transistor 1194 may be used (during the interval D2) to route charges to a floating diffusion node 1190 which has a capacitance represented by capacitor Cfd 1114. A second transfer transistor 1196 may be used (during the interval D3) to route charges to an overflow capacitor Cov 1112. An overflow charge transfer transistor 1108 may be coupled between the floating diffusion node 1190 and a reset transistor 1110. One end of the overflow capacitor Cov 1112 may be coupled to a node in between the serially connected reset and overflow charge transfer transistors 1110 and 1108, while the other end of the overflow capacitor Cov 1112 may be connected to a fixed potential source 1122. The fixed potential source 1122 may be held/provided at the pixel supply voltage VAA, the pixel ground voltage, or any other suitable voltage. The gate terminal of a source-follower transistor 1116 may also be coupled to the floating diffusion node 1190. A first source-drain terminal of the source-follower transistor 1116 may be coupled to the pixel voltage supply VAA, while a second source-drain terminal of the source-follower transistor 1116 may be coupled to a row select transistor 618. Row select transistor 1118 may be coupled between the second source-drain terminal of the source-follower transistor 1116 and the pixel output line 1120 (also labeled PIXOUT in FIG. 11C).

When multiple photodiodes are present in an inner or outer sub-pixel group, the photodiodes associated with the inner or outer sub-pixel group may be connected in parallel, in the place of PD2 or PD1, respectively. Alternatively, each of the photodiodes (such as those in the sub-pixels 404-1 through 404-8) may be provided with a respective transfer gate 1106 and anti-blooming transistor 1104. In other words, when an outer sub-pixel group includes multiple photodiodes, the outer photodiode transfer circuitry 1152 may be duplicated for each of the photodiodes in the outer sub-pixel group, and connected in parallel. Similarly, whenever an inner sub-pixel group includes multiple photodiodes, the inner coupled gate structure 1198 and the photodiode PD2 may be duplicated for each of the photodiodes in the inner sub-pixel group, and connected in parallel. Duplicating the coupled gates structure 1198 with the photodiode PD2, and the outer photodiode transfer circuit 1152 for each of the photodiodes in the inner and outer sub-pixel groups, respectively, may allow for independent readout of each of the photodiodes in the inner or outer sub-pixel groups. The pixel circuits of FIG. 6, 9C, or 11C may form one of the pixels 22 in the array 20 on the image sensor 16. Array 20 may have any number of rows and columns of pixels 22. In general, the size of array 20 and the number of rows and columns in array 20 will depend on the particular implementation of image sensor 16. While rows and columns are generally described herein as being horizontal and vertical, respectively, rows and columns may refer to any grid-like structure (e.g., features described herein as rows may be arranged vertically and features described herein as columns may be arranged horizontally).

If desired, array 20 may be part of a stacked-die arrangement in which pixels 22 of array 20 are split between two or more stacked substrates. In such an arrangement, each of the pixels 22 in the array 20 may be split between the two dies at any desired node within pixel. As an example, a node such as the floating diffusion node may be formed across two dies. Pixel circuitry that includes the photodiode and the circuitry coupled between the photodiodes PD1/PD2 and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any known metal-to-metal bonding technique, such as soldering or welding.

As mentioned above, the desired node in the pixel circuit that is split across the two dies may be a floating diffusion node. Alternatively, the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

Figure 12:
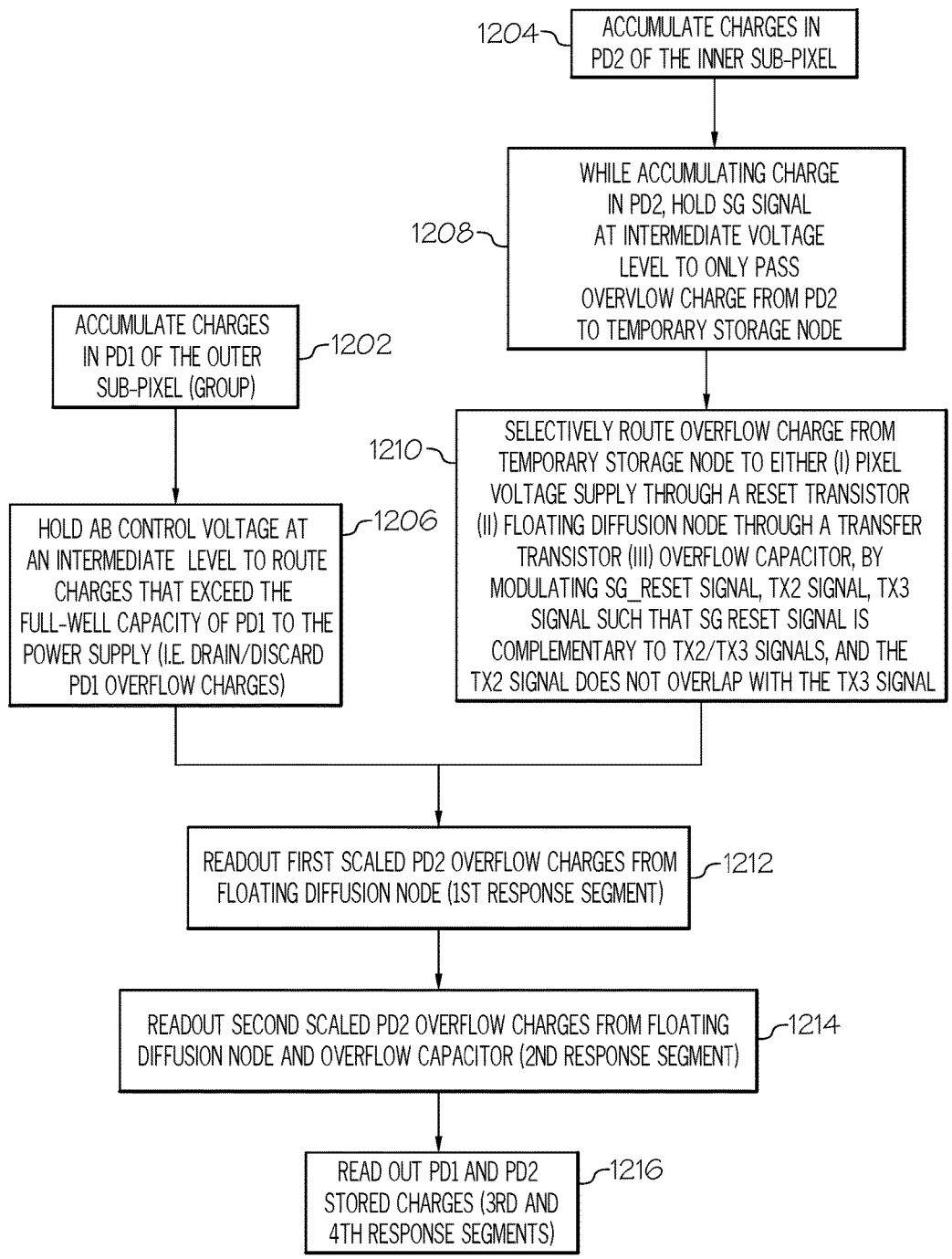
FIG. 12 is a flow chart of illustrative steps that may be performed to operate the pixel circuit of FIG. 11C, in accordance with an embodiment.

The pixel circuit of FIG. 11C may be operated using the method illustrated in FIG. 12. In step 1202 of FIG. 12, charges may be accumulated in the photodiode PD1 of the outer sub-pixel or sub-pixel group. As described above, when the outer sub-pixel group contains more than one sub-pixel (and consequently, more than one photodiode), it may assumed that the photodiodes of the more than one sub-pixel are connected in parallel, thereby effectively functioning as a single photodiode which is represented by PD1 in FIG. 11C. However, as described above, the photodiode transfer circuits 1152 and the coupled gates structure 1198 with the photodiode PD2 may be duplicated and connected in parallel for each of the photodiodes in the outer/inner sub-pixel groups respectively, enabling each of said photodiodes to have its associated charges transferred and read out independently. Charges may be accumulated in step 1202 in response to incident light hitting the light collecting area of the outer sub-pixel or sub-pixel group.

In step 1204 of FIG. 12, charges may be accumulated in the photodiode PD2 of the inner sub-pixel. Charges may be accumulated in step 1202 in response to incident light hitting the light collecting area of the inner sub-pixel. Steps 1202 and 1204 may occur simultaneously.

In step 1206 of FIG. 12, the AB control voltage provided to the anti-blooming transistor 1104 may be held at an intermediate voltage that is less than the pixel supply voltage VAA to route excess charges accumulated in PD1 after PD1 has accumulated an amount of charge equal to the full-well capacity of PD1 to the voltage supply terminal VAA which is coupled to the anti-blooming transistor 1104. As an alternative to holding the anti-blooming transistor 1104 gate at an intermediate voltage that is less than the pixel supply voltage VAA, the gate of transistor 1104 may be periodically asserted to VAA (or an intermediate voltage less than VAA) and then de-asserted to the pixel ground voltage. The assertion of the AB control voltage provided to the anti-blooming transistor 1104 to VAA or an intermediate voltage less than VAA may route the excess charges accumulated in the PD1 photodiode to the pixel voltage supply, thereby draining (i.e., discarding) these excess charges from the PD1 photodiode.

Steps 1208 and 1210 may be performed for selectively routing overflow charge while charge is accumulating in the photodiode PD2, in accordance with the timing diagram of FIG. 11B. In step 1208, signal SG may be held at an intermediate voltage level (either constantly or periodically pulsed) such that overflow charge is allowed to pass from photodiode PD2 through storage gate 1102 to temporary storage node 1193. In some embodiments, a voltage greater than or equal to the pixel supply voltage VAA may be applied as the SG voltage (either constantly or periodically pulsed). The application of the SG voltage as a voltage that is either less than VAA, equal to VAA, or greater than VAA (constantly, or periodically pulsed) may be referred to as setting an overflow threshold for the storage gate transistor 902.

In step 1210, overflow charge may be selectively routed from temporary storage node 1193 either to pixel voltage supply VAA through storage gate reset transistor 1192 (in an interval D4 as shown in FIG. 11B), to floating diffusion node 1190 through transfer transistor 1194 (in an interval D2 as shown in FIG. 11B), or to the overflow capacitor 1112 (in an interval D3 as shown in FIG. 11B). This selective routing may be performed by modulating signals SG_RESET, TX2, and TX3 such that the three signals alternate as illustrated in FIG. 11B. Specifically, the signals SG_RESET, TX2, and TX3 may be alternated such that the SG_RESET signal is complementary to the TX2/TX3 signals (i.e., SG_RESET is asserted only when both TX2 and TX3 are deasserted) and such that the TX2 signal does not overlap the TX3 signal (i.e., TX2 is asserted only when TX3 is deasserted).

Because overflow charges are routed to the floating diffusion node 1190 only during periodic intervals D2, the PD2 overflow charges at floating diffusion node 1190 may be referred to as first scaled overflow charges. Specifically, the amount of overflow charge transferred to the floating diffusion node 1190 may be scaled by the LFM ratio D2/D1, such that D2/D1 multiplied by the total overflow charge is present at the floating diffusion node after step 1210. Similarly, because overflow charges are routed to the overflow capacitor 1112 only during periodic intervals D3, the PD2 overflow charges at overflow capacitor 1112 may be referred to as second scaled overflow charges. Specifically, the amount of overflow charge transferred to the floating diffusion node 1190 may be scaled by the LFM ratio D3/D1, such that D3/D1 multiplied by the total overflow charge is present at the overflow capacitor 1112 after step 1210.

At step 1212, the first scaled overflow charges may be read out. Read out of the charges stored in the floating diffusion capacitance Cfd 1114 (i.e., the floating diffusion node 1190) may occur by asserting the RS gate control signal provided to the row-select transistor 918. During the read out of step 1212, the gate voltages TX1, TX2, and TX3 may be deasserted. The readout of step 1212 may correspond to a first response segment.

At step 1214, which occurs subsequent to step 1212, the PD2 overflow charges stored in the Cov capacitor 1112 may be read out in combination with the overflow charges stored in the floating diffusion capacitance Cfd 1114. Read out of the charges stored in the Cov capacitor 1112 and the floating diffusion capacitance Cfd 1114 may occur by asserting the RS gate control signal provided to the row-select transistor 1118 while the overflow charge transfer capacitor 1108 gate control signal DCG is also asserted. During the read out of step 1214, the gate voltages TX1, TX2, and TX3 may be deasserted. After the read out of step 1214 (i.e., after the row-select transistor 618 gate control RS has been asserted, thereby reading out a signal proportional to the charge on the Cov capacitor 1112 and the Cfd capacitor 1114), the RST gate control signal provided to the reset transistor 1110 may be asserted, thereby resetting the Cov capacitor 1112 and the Cfd capacitor 1114. The readout of step 1214 may correspond to a second response segment.

At step 1216, the respective charges stored in PD1 and PD2 may be read out. The order in which the charges stored in PD1 and PD2 are read out may vary. Specifically, in certain embodiments the charges stored in PD1 may be read out before the charges in PD2 are read out, whereas in other embodiments the charges stored in PD2 may be read out before the charges in PD1 are read out. Read out of the charges of PD1 or PD2 may be achieved by asserting the gate control signal for the transfer transistor associated with PD1 or PD2 (i.e., asserting TX1 for the read out of PD1, and asserting TX2 and SG to a voltage $V_H$ for the read out of PD2 as shown in portion 1184 of FIG. 11B) while deasserting the DCG control signal provided to transistor 1108, thereby routing the charges from PD1 or PD2 to the floating diffusion node 1190 (or equivalently, the Cfd capacitor 1114). Read out of the PD1 or PD2 charges stored in the floating diffusion capacitance Cfd 1114 may occur by asserting the RS gate control signal provided to the row-select transistor 1118 while the overflow charge transfer capacitor 1108 gate control signal DCG is deasserted. After the read out of each of the PD1 stored charges and the PD2 stored charges in step 1216 (i.e., after the row-select transistor 1118 gate control RS has been asserted, thereby reading out a signal proportional to the charge on the Cfd capacitor 1114 for each of the PD1 and PD2 stored charges), the RST gate control signal provided to the reset transistor 1110 may be asserted, thereby resetting the Cfd capacitor 1114. The read out in step 1216 may correspond to third and fourth response segments.

As shown above, a pixel may be implemented with multiple sub-pixels that are nested within one another. An inner sub-pixel may have a circular, elliptical, square, rectangular, or any other suitable polygonal shape. The outer boundary of the pixel with nested sub-pixels may be square or rectangular, or any other suitable polygon. An inner sub-pixel may have one or more photodiodes, and may have a lower total light collecting surface than sub-pixels in which the inner sub-pixel is nested. As an example, when a pixel has a single inner sub-pixel and a single outer sub-pixel in which the inner sub-pixel is nested, the photodiode(s) in the inner sub-pixel may have a lower light collecting area compared to the light collecting area of the outer sub-pixel (i.e., the area on the surface of the photodiode(s) of the inner sub-pixel may be less than the area on the surface of the photodiode(s) of the outer sub-pixel).

The inner sub-pixel and one or more outer sub-pixel groups in a nested image pixel may have the same geometric optical centers. In other words, because the one or more outer sub-pixel groups surround the inner sub-pixel symmetrically, the center of the surface of the inner sub-pixel group is the same as the center of the respective surfaces of each of the one or more outer sub-pixel groups that surround the inner sub-pixel. The one or more outer sub-pixel groups that surround the inner sub-pixel may have greater respective light sensitivities than the light sensitivity of the inner sub-pixel. As an example, for a given amount of light over a nested sub-pixel pixel, more photogenerated charges will be produced in the one or more outer sub-pixel groups than will be produced in the inner sub-pixel of the nested sub-pixels. The ratio of the light sensitivity of the one or more outer sub-pixel groups to the light sensitivity of the inner sub-pixel of a nested sub-pixel pixel may be at least 4 to 1, but could be 5 to 1, 10 to 1, any intermediate ratio, or any larger ratio. In other words, the light sensitivity of the one or more outer sub-pixel groups may be at least four times greater than the light sensitivity of the inner sub-pixel. Light sensitivity may refer to the amount of light collected by a given sub-pixel or sub-pixel group, and may be determined by the light collecting area of a sub-pixel or sub-pixel group, amount and shape of microlenses formed over a sub-pixel or sub-pixel group, type of color filter formed over a sub-pixel or sub-pixel group, or other attributes of a sub-pixel or sub-pixel group.

When using a smaller light collection area in the inner sub-pixel, and optionally enabling flicker mitigation pixel operations that route portions of overflow charges to either a power supply (thereby discarding the charges), or to a capacitor (such as an overflow capacitor and/or a floating diffusion capacitor), the size of the capacitors required in each pixel having nested sub-pixel groups may be reduced. As the feature size of pixels reduces, capacitors with a size adequate to achieve a sufficient charge storage capability for the pixel become harder to design/produce. However, when pixels having photodiodes with smaller light collecting regions are used, in conjunction with optional flicker mitigation operations in which only portions of captured/overflow charges are retained, multiple response curves can be reconstructed using the charges captured and overflowed from the pixel photodiodes. Such a capture and reconstruction of multiple response curves for one or more photodiodes in inner and outer sub-pixels (or, sub-pixel groups) results in a pixel that is capable of operating with an improved dynamic range.

Some embodiments may employ an overflow capacitor that is coupled to the floating diffusion node via an overflow charge transfer transistor. During a charge capture interval, charges may be captured in one or more photodiodes in the inner sub-pixel (or sub-pixel group) and the outer sub-pixel (or sub-pixel group). Excess charges in the photodiode(s) of the outer sub-pixel may be discarded by means of an anti-blooming transistor that is held at some intermediate level between the pixel ground voltage and the pixel supply voltage, thereby routing charges that exceed a threshold level that is related to the full-well capacity of the photodiode(s) of the outer sub-pixel off to the pixel supply voltage. Meanwhile, in the photodiode(s) of the inner sub-pixel, charges may accumulate, while a transfer transistor coupled to the photodiode(s) of the inner sub-pixel is provided an intermediate voltage level between pixel ground and the pixel supply level, to route overflow charges of the photodiode(s) for the inner sub-pixel out of said photodiode(s). As charges are routed out of the photodiode(s) in the inner sub-pixel, the overflow charge transfer transistor that is coupled between the floating diffusion node and the charge overflow capacitor may be activated, thereby dividing the overflow charges between the floating diffusion node and the floating diffusion node. At the end of charge integration, the overflow charges from the photodiode(s) from the inner sub-pixel may be read out, while the overflow charge transfer transistor remains activated. Subsequently, the charges on the overflow capacitor and the floating diffusion node may be reset using a reset transistor. Charges stored in the respective photodiode(s) of the inner and outer sub-pixels may then be read out.

In some embodiments, a coupled gate structure may be employed. A coupled gate structure may be coupled to the photodiode(s) in the inner sub-pixel group. The coupled gate structure may be used to selectively route overflow charges for the photodiode(s) of the inner sub-pixel either to the floating diffusion node, or to a pixel voltage supply (thereby discarding the charges). The proportion of the integration period for which the charges are transferred to the floating diffusion node may be referred to as the inverse of a flicker mitigation constant (i.e., the flicker mitigation constant may be the inverse of the ratio between the time the charges are routed to the floating diffusion node and the total integration time). The response portion captured at the floating diffusion node during the integration time where overflow charges are selectively routed using such a coupled gate structure may be a scaled response of the overflow charges for the photodiode(s) of the inner sub-pixel. Readout of such a pixel may begin with a readout of the scaled overflow response. Subsequently, the charges stored in the respective photodiode(s) of the inner and outer sub-pixels may be read out.

In other embodiments, a modified coupled gate structure may be employed. The modified coupled gate structure may be coupled to the photodiode(s) in the inner sub-pixel group. The modified coupled gate structure may be used to selectively route overflow charges for the photodiode(s) of the inner sub-pixel either to the floating diffusion node (to produce a first scaled overflow response), an overflow charge capacitor (to produce a second scaled overflow response), or to a pixel voltage supply (thereby discarding the charges). The proportion of the integration period during which overflow charges are routed to the floating diffusion may be associated with a first flicker mitigation constant, and the proportion of the integration period during which overflow charges are routed to the overflow capacitor may be associated with a second flicker mitigation constant. Readout of such a pixel may begin with a readout of the first scaled overflow response of charges that were routed to the floating diffusion node. Then, the second scaled overflow response may be read out from the overflow capacitor. Finally, the charges stored in the respective photodiode(s) of the inner and outer sub-pixels may be read out.

The foregoing is merely illustrative of the principles of this invention, which can be practiced in other embodiments.

What is claimed is:

1. An image pixel, comprising:
   a first sub-pixel group having a first set of at least one photodiode;
   a second sub-pixel group having a second set of at least one photodiode;
   at least one gating transistor that routes overflow charges from the second photodiode to at least one storage node while charges are accumulated in the second photodiode, wherein the at least one gating transistor comprises a coupled gates structure that comprises:
   a first transfer transistor that routes a first portion of the overflow charges from the second set of at least one photodiode to a floating diffusion node in the image pixel;
   a second transfer transistor that discards a second portion of the overflow charges from the second set of at least one photodiode by routing the second portion of the overflow charges to a pixel voltage supply.

2. The image pixel defined in claim 1, wherein the second sub-pixel group is nested within the first sub-pixel group.

3. The image pixel defined in claim 1, wherein the first sub-pixel group has a greater effective light collecting area than the second sub-pixel group.

4. The image pixel defined in claim 1, wherein the first set of at least one photodiode in the first sub-pixel group comprises multiple photodiodes, wherein each of the multiple photodiodes in the first sub-pixel group has an associated transfer transistor.

5. The image pixel defined in claim 1, wherein the first sub-pixel group comprises a group of multiple sub-pixels each having a respective photodiode, wherein the photodiodes of the group of multiple sub-pixels are connected in parallel.

6. The image pixel defined in claim 1, wherein a control voltage level that sets an overflow threshold on the at least one gating transistor is applied to the at least one gating transistor, wherein the control voltage level that is selected from the group consisting of: a voltage less than the supply voltage level, a voltage that is equal to the supply voltage, and a voltage that is greater than the supply voltage.

7. The image pixel defined in claim 1, wherein a first control signal for the first transfer transistor is asserted during a first interval, wherein a second control signal for the second transfer transistor is asserted during a second interval, and wherein the first interval does not overlap the second interval.

8. The image pixel defined in claim 1, further comprising:
 a charge overflow capacitor that is separate from the floating diffusion node in the image pixel, wherein the coupled gates structure further comprises:
  a third transfer transistor that routes a third portion of the overflow charge from the second set of at least one photodiode to the charge overflow capacitor.

9. The image pixel defined in claim 8, wherein a first control signal for the first transfer transistor is asserted during a first interval, wherein a second control signal for the second transfer transistor is asserted during a second interval, wherein a third control signal for the third transfer transistor is asserted during a third interval, and wherein the first, second, and third intervals are non-overlapping.

10. A method of operating an image pixel, comprising:
 accumulating charges in a first photodiode in a first sub-pixel group of the image pixel;
 accumulating charges in a second photodiode in a second sub-pixel group of the image pixel, wherein the second sub-pixel group is nested in the first sub-pixel group;
 periodically routing overflow charges from the second photodiode to a floating diffusion node in the image pixel;
 reading out the overflow charges from the second photodiode; and
 while routing the overflow charges from the second photodiode to the floating diffusion node, asserting the gate of an overflow charge transfer transistor to spread the overflow charges between the floating diffusion node and an overflow capacitor that is coupled to the overflow charge transfer transistor.

11. The method of claim 10, further comprising:
 discarding overflow charges from the first photodiode via an anti-blooming transistor coupled to the first photodiode.

12. The method of claim 10, wherein periodically routing the overflow charges from the second photodiode to the floating diffusion node comprises routing a first portion of the overflow charges from the second photodiode to the floating diffusion node, the method further comprising:
 periodically discarding a second portion of the overflow charges, wherein the first portion of the overflow charges are routed to the floating diffusion node during a first interval, wherein the second portion of the overflow charges are discarded during a second interval, and wherein the first and second intervals are non-overlapping.

13. The method of claim 12, wherein a flicker mitigation constant of the image pixel is equal to the sum of the respective durations of the first and second intervals divided by the duration of the first interval, the method further comprising:
 adjusting the flicker mitigation constant of the image pixel during operation of the image pixel.

14. The method of claim 12, further comprising:
 periodically routing a third portion of the overflow charges to an overflow capacitor in a third interval, wherein the first, second, and third intervals are non-overlapping.

15. The method of claim 14, wherein a first flicker mitigation constant of the image pixel is equal to the sum of the respective durations of the first, second, and third intervals divided by the duration of the first interval, and wherein a second flicker mitigation constant of the image pixel is equal to the sum of the respective durations of the first, second, and third intervals divided by the duration of the third interval, the method further comprising:
 adjusting the first and second flicker mitigation constants of the image pixel during operation of the image pixel.

16. An image sensor, comprising:
 an array of image sensor pixels, wherein each of the image sensor pixels comprises:
  at least two sub-pixels having at least two respective photodiodes, wherein one of the at least two sub-pixels is nested within another one of the at least two-sub pixels;
  at least one storage node that receives overflow charges from a given one of the at least two photodiodes, wherein the at least one storage node comprises:
   a floating diffusion node; and
   an overflow charge storage node that is separate from the floating diffusion node, wherein each of the image sensor pixels further comprise:
  a transfer gate coupled between the given photodiode and the at least one storage node.

17. The image sensor of claim 16, wherein the transfer gate comprises a first transfer gate that is coupled between the given photodiode and the floating diffusion node, and wherein each of the image sensor pixels further comprises:
 a second transfer gate that is coupled between the given photodiode and the overflow charge storage node.

* * * * *

UNITED STATES PATENT AND TRADEMARK OFFICE
CERTIFICATE OF CORRECTION

PATENT NO. : 10,110,839 B2
APPLICATION NO. : 15/145374
DATED : October 23, 2018
INVENTOR(S) : Marko Mlinar, Tomas Geurts and Manuel Innocent It is certified that error appears in the above-identified patent and that said Letters Patent is hereby corrected as shown below:

In the Claims

Column 26, Line 44, "one photodiode;" should read -- one photodiode; and --

Column 26, Line 46, "second photodiode" should read -- second set of at least one photodiode --

Column 26, Lines 47-48, "second photo-diode," should read -- second set of at least one photodiode, --

Column 26, Line 53, "pixel;" should read -- pixel; and --

Column 27, Line 9, "level that is selected" should read -- level is selected --

Signed and Sealed this
Seventh Day of March, 2023

Katherine Kelly Vidal
*Director of the United States Patent and Trademark Office*